(12) United States Patent  
Lubitz et al.

(10) Patent No.: US 11,608,408 B2  
(45) Date of Patent: *Mar. 21, 2023

(54) POLYURETHANE COMPRISING GRAPHENE NANO STRUCTURE

(71) Applicant: BASF SE, Ludwigshafen am Rhein (DE)

(72) Inventors: Michael Jae Lubitz, Waterford, MI (US); Andrew Schuster, Malcom, IA (US); Janine Luesing, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,219

(22) PCT Filed: Nov. 9, 2017

(86) PCT No.: PCT/US2017/060877  
§ 371 (c)(1),  
(2) Date: May 8, 2019

(87) PCT Pub. No.: WO2018/089645  
PCT Pub. Date: May 17, 2018

(65) Prior Publication Data  
US 2019/0322789 A1  Oct. 24, 2019

Related U.S. Application Data

(60) Provisional application No. 62/419,753, filed on Nov. 9, 2016.

(51) Int. Cl.  
C08G 18/76  (2006.01)  
C08K 3/04  (2006.01)  
C08G 18/42  (2006.01)  
C08G 18/48  (2006.01)  
C08K 7/00  (2006.01)  
C08G 18/10  (2006.01)  
C08K 5/053  (2006.01)  
C08K 5/17  (2006.01)  
C08L 75/04  (2006.01)  
C08K 5/00  (2006.01)  
C08G 18/12  (2006.01)  
C08G 18/18  (2006.01)  
C08G 18/40  (2006.01)

(52) U.S. Cl.  
CPC ......... *C08G 18/7671* (2013.01); *C08G 18/10* (2013.01); *C08G 18/12* (2013.01); *C08G 18/1808* (2013.01); *C08G 18/4018* (2013.01); *C08G 18/4238* (2013.01); *C08G 18/4277* (2013.01); *C08G 18/48* (2013.01); *C08G 18/4854* (2013.01); *C08G 18/4887* (2013.01); *C08K 3/042* (2017.05); *C08K 5/0025* (2013.01); *C08K 5/053* (2013.01); *C08K 5/17* (2013.01); *C08K 7/00* (2013.01); *C08L 75/04* (2013.01); *C08K 2201/005* (2013.01); *C08K 2201/011* (2013.01); *C08L 2207/04* (2013.01)

(58) Field of Classification Search  
CPC ............ C08G 18/7671; C08G 18/4238; C08G 18/4277; C08G 18/4854; C08G 18/4887; C08G 18/10; C08G 18/48; C08G 18/12; C08G 18/1808; C08G 18/4018; C08K 3/042; C08K 7/00; C08K 5/053; C08K 5/17; C08K 5/0025; C08K 2201/011; C08K 2201/005; C08L 75/04; C08L 2207/04  
See application file for complete search history.

(56) References Cited

U.S. PATENT DOCUMENTS

| 5,667,716 | A * | 9/1997 | Ziolo | H01F 1/0063 |
| | | | | 252/62.52 |
| 8,785,540 | B2 * | 7/2014 | Muller | C09J 131/04 |
| | | | | 524/457 |
| 2008/0093104 | A1 * | 4/2008 | Gahleitner | C08L 23/04 |
| 2009/0246811 | A1 * | 10/2009 | Arakawa | C12Q 1/44 |
| | | | | 435/19 |
| 2010/0160545 | A1 * | 6/2010 | Page | C08L 75/04 |
| | | | | 524/589 |
| 2010/0249273 | A1 * | 9/2010 | Scales | C08L 33/04 |
| | | | | 523/210 |
| 2011/0046286 | A1 * | 2/2011 | Lubnin | C08G 18/12 |
| | | | | 524/425 |
| 2014/0174991 | A1 * | 6/2014 | Khripin | B01D 15/02 |
| | | | | 209/3.1 |
| 2015/0073082 | A1 * | 3/2015 | Mukohata | C08K 3/04 |
| | | | | 524/427 |
| 2016/0254466 | A1 * | 9/2016 | Koizumi | C23C 18/2086 |
| | | | | 257/40 |
| 2017/0361376 | A1 * | 12/2017 | Murugesan | C09B 67/0097 |
| 2019/0315909 | A1 * | 10/2019 | Luesing | C08G 18/12 |

FOREIGN PATENT DOCUMENTS

EP  2868626  *  5/2015

OTHER PUBLICATIONS

Kovtun et al., "Benchmarking of Graphene-Based Materials: Real Commercial Products Versus Ideal Graphene", 2D Mater., 6, 025006, Jan. 24, 2019, pp. 1-13.*

(Continued)

*Primary Examiner* — Patrick D Niland  
(74) *Attorney, Agent, or Firm* — Armstrong Teasdale LLP

(57) ABSTRACT

Described herein is a polyurethane including a reaction product of an isocyanate component, a polyol component, and graphene nano platelets. The graphene nano platelets are reacted in an amount of from about 0.1 to about 20% by weight, based on a total weight of the polyurethane. The graphene nano platelets have an average lateral dimension (x, y) of from about 1 to about 100 μm, an average through-plane dimension (z) of from about 5 to about 100 nm, and an oxygen content of from about 0.01 to about 10% by weight, based on a total weight of the graphene nano platelets.

32 Claims, 8 Drawing Sheets

(56) References Cited

OTHER PUBLICATIONS

Author Unknown, Bayer Material Science Bulletin, "Desmopan (TPU) Product Range-Reference Data", Edition 2004-09, (2004), pp. 1-22.*
Dul et al., "Effect of Graphene Nanoplatelets Structure on the Properties of Acrylonitrile-Butadiene-Styrene Composites", Society of Plastics Engineers, Published online in Wiley Online Library (wileyonlinelibrary.com), 2017, pp. E285 to E300.*
International Search Report for International Application No. PCT/US2017/060877, dated Feb. 14, 2018, 3 pages.
Written Opinion for International Application No. PCT/US2017/060877, dated Feb. 14, 2018, 7 pages.
Amir, et al., "Graphene nanoplatelets loaded polyurethane and phenolic resin fibres by combination of pressure and gyration", Composites Science and Technology, vol. 129, 2016, pp. 173-182.
Chen, et al., "Mechanical Reinforcement in Thermoplastic Polyurethane Nanocomposite Incorporated with Polydopamine Functionalized Graphene Nanoplatelet", Industrial & Engineering Chemistry Research, vol. 56, Issue 41, 2017, pp. 11827-11838.
Kaur, et al., "Graphene/polyurethane composites: fabrication and evaluation of electrical conductivity, mechanical properties and cell viability", RSC Advances, vol. 5, Issue 120, 2015, pp. 98762-98772.

* cited by examiner

POLYURETHANE COMPRISING GRAPHENE NANO STRUCTURE

CROSS-REFERENCE TO RELATED APPLICATIONS

This application is a U.S. National Phase Application of PCT/US2017/060877, filed Nov. 9, 2017, which claims the benefit of priority to U.S. Provisional Patent Application No. 62/419,753, filed Nov. 9, 2016, the entire contents of which are hereby incorporated by reference herein.

FIELD OF THE DISCLOSURE

The subject disclosure generally relates to a polyurethane comprising graphene nano platelets.

DESCRIPTION OF THE RELATED ART

The use of fillers to improve the physical and rheological properties of polymeric materials is known in the art. For example, lie addition of conductive filler to a polymer can impart conductivity on the resulting polymeric material, which would otherwise act as an insulator. As another example, the addition of reinforcing filler to a polymer can impart improved load, creep, fatigue, strength, durability, and other properties on the resulting polymeric material.

However, the use of fillers in polymeric materials sometimes comes with disadvantages. For example, large quantities of fillers are often required to achieve the desired properties, but can make processing difficult. e.g. compounding can be difficult. As another example, the use of filler in polymeric materials can decrease the elongation of the polymeric materials. As a final example, the use of filler in polymeric materials can cause embrittlement of the polymeric materials.

Further, fillers, especially nano sized fillers, can be hard to disperse within a polymer matrix, and thus result in a polymeric material having inconsistent physical and rheological properties. As such, the use of filler in a polymeric material positively impacts certain properties of the polymeric material while negatively impacting other properties of the polymeric material. In an attempt to overcome such dispersion issues, nano sized fillers such as graphene have been pre-processed via sonication, exfoliation, and intercollation, and dispersed within polymeric materials via complicated, solvent based processes with limited success. Accordingly, there remains an opportunity for improvement.

SUMMARY OF THE INVENTION AND ADVANTAGES

A polyurethane comprising the reaction product of an isocyanate component, a polyol component, and graphene nano platelets is disclosed. The graphene nano platelets are reacted in an amount of from about 0.1 to about 20% by weight, based on the total weight of the polyurethane. The graphene nano platelets have an average lateral dimension (x, y) of from about 1 to about 100 μm, an average through-plane dimension (z) of from about 5 to about 100 nm, and an oxygen content of from about 0.01 to about 10% by weight, based on the total weight of the graphene nano platelets.

An isocyanate prepolymer including graphene nano platelets and having an isocyanate content from about 4 to about 30% by weight is also disclosed. The isocyanate prepolymer comprises the reaction product of an aromatic isocyanate, a polyol, and graphene nano platelets ("GNP"). The GNP is reacted in an amount of 0.1 to about 20% by weight, based on the total weight of the isocyanate prepolymer. The GNP have an average lateral dimension (x, y) of from about 1 to about 100 μm, an average through-plane dimension (z) of from about 5 to about 100 nm, and an oxygen content of from about 0.01 to about 10% by weight, based on the total weight of the GNP. A method of forming the isocyanate prepolymer comprising GNP is also disclosed.

The isocyanate prepolymer including GNP allows for excellent dispersion of the GNP in cast polyurethanes, thermoplastic polyurethanes, and polyurethane foams. Further, such polyurethanes exhibit excellent physical and rheological properties with inclusion of a minimal amount of GNP. Furthermore, polyurethanes formed from the isocyanate prepolymer including GNP exhibit the excellent physical properties associated with filled polyurethanes without the disadvantages physical properties associated with filled polyurethanes.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE INVENTION

Figure 1A:
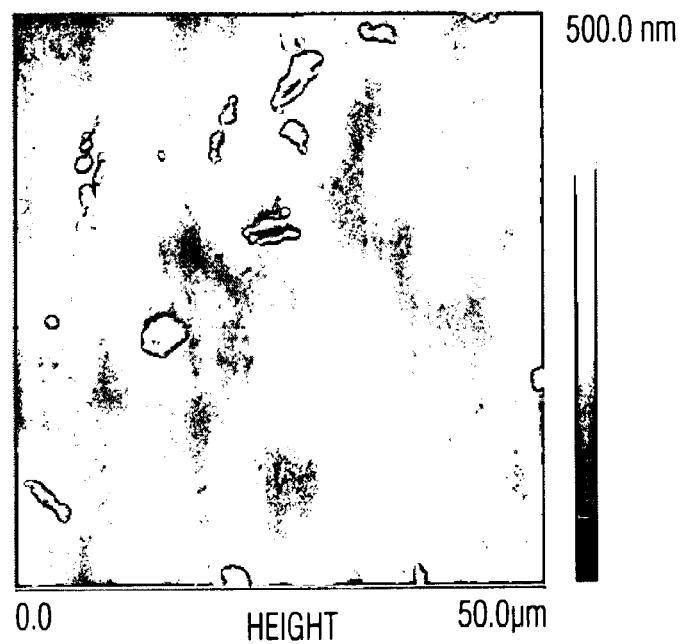
FIG. 1A is an atomic-force microscopy (AFM) image of a polyurethane formed with an isocyanate prepolymer comprising graphene nano platelets.

The instant disclosure provides an isocyanate prepolymer ("isocyanate prepolymer") comprising graphene nano platelets ("GNP") and a method of forming the isocyanate prepolymer. The isocyanate prepolymer comprises the reaction product of an aromatic isocyanate, a polyol, and the GNP.

The isocyanate prepolymer comprises the reaction product of the aromatic isocyanate, the polyol, and the GNP. The isocyanate prepolymer may comprise the reaction of one or more types of the aromatic isocyanate with one or more types of the polyol and one or more types of the GNP.

The Aromatic Isocyanate:

The aromatic isocyanate is any molecule or macromolecule which includes one or more aromatic groups and one or more isocyanate (NCO) groups. In various embodiments, the aromatic isocyanate comprises one or more aromatic groups and a plurality of NCO functional groups, e.g. 2, 3, 4, 5, 6, 7, or 8 functional groups, or any value or ranges of values therein. The aromatic isocyanate component is not particularly limited and may be any known in the art.

Of course, one or more different types (i.e. different species) of the aromatic isocyanate can be reacted to form the isocyanate prepolymer. That is, the reaction of more than one individual aromatic isocyanate is contemplated herein.

The aromatic isocyanate typically corresponds to the formula R'(NCO)z wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate. 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof.

Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof. In one embodiment, the isocyanate includes a diisocyanate selected from the group of methylene diphenyl diisocyanates, toluene diisocyanates, hexamethylene diisocyanates, H12MDIs, and combinations thereof.

In certain embodiments, the aromatic isocyanate is chosen from diphenylmethane diisocyanates (MDIs), polymeric diphenylmethane diisocyanates (pMDIs), and combinations thereof. In some embodiments, the aromatic isocyanate is MDI, e.g. 2,2'-diphenylmethane diisocyanate, 2,4'-diphenylmethane diisocyanate. In other embodiments, the aromatic isocyanate is pMDI, i.e., polymeric methylene-4,4'-diphenyl diisocyanate. In further embodiments, the aromatic isocyanate comprises MDI and pMDI. That is, in further embodiments, the aromatic isocyanate is MDI and pMDI. Suitable aromatic isocyanates are commercially available from BASF Corporation of Wyandotte, Mich., under the trade name of LUPRANATE®.

It is contemplated that the aromatic isocyanate may have any % NCO content, any nominal functionality, any number average molecular weight, and any viscosity, depending on which aromatic isocyanate is chosen. Examples of particularly useful aromatic isocyanates have % NCO contents of from 2 to 50, more typically of from 4 to 35, and most typically of from 6 to 20, percent by weight. Determination of the % NCO contents on percents by weight is accomplished by a standard chemical titration analysis known to those skilled in the art. It is to be understood that the aromatic isocyanate may have any molecular weight.

In some embodiments, additional isocyanates, which are not aromatic, can also be reacted to form the isocyanate prepolymer. That is, the reaction of the aromatic isocyanate and one or more additional isocyanates, e.g. aliphatic isocyanates, with the polyol and the GNP is contemplated herein. Notably, any combination of the aromatic and aliphatic isocyanates described herein can be used to form the cast elastomers, thermoplastic polyurethanes, and polyurethane foams described further below.

The Polyol:

Referring now to the polyol, the aromatic isocyanate is reacted with the polyol (and the GNP too) to form the isocyanate prepolymer. The polyol has average hydroxyl functionality of greater than 1, e.g. has greater than 1 hydroxyl functional groups that are reactive with the NCO functional groups of the aromatic isocyanate. The polyol can have any functionality, e.g. of at least 1, 2, 3, 4, 5, 6, 7, or 8, or any value or range of values therebetween. The polyol can have a weight average molecular weight ($M_w$) of from about 100 to about 10,000, alternatively from about 400 to about 4,000, alternatively from about 900 to about 3000, g/mol, or any value or range of values therebetween.

Of course, one or more different types (i.e. different species) of the polyol can be reacted to form the isocyanate prepolymer. That is, the reaction of more than one individual polyol is contemplated herein.

The polyol is not particularly limited and may be chosen from a polyester polyol, a polyether polyol, a polyether/ester polyol, and combinations thereof. In other embodiments, the polyol is a caprolactone based polyol, a poly THF polyol, a polycarbonate polyol, a bio based polyol, and combinations thereof, as would be understood in the art. Furthermore, the polyol may be chosen from aliphatic polyols, cycloaliphatic polyols, aromatic polyols, heterocyclic polyols, and combinations thereof. Some examples of suitable polyols include, but are not limited to, glycol-initiated polyols, glycerine-initiated polyols, sucrose-initiated polyols, sucrose/glycerine-initiated polyols, trimethylolpropane-initiated polyols, and combinations thereof.

Suitable polyether polyols include products obtained by the polymerization of a cyclic oxide, such as ethylene oxide (EO), propylene oxide (PO), butylene oxide (BO), and tetrahydrofuran in the presence of a polyfunctional initiator. Suitable initiator compounds include a plurality of active hydrogen atoms, and include, but are not limited to, water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by simultaneous or sequential addition of ethylene and propylene oxides to di- or trifunctional initiators. Copolymers having oxyethylene contents of from about 5 to about 95% by weight, and copolymers having oxypropylene contents of from about 5 to about 100% by weight, based on the total weight of the polyol component, may also be used. These copolymers may be block copolymers, random/block copolymers, or random copolymers. Yet other suitable polyether polyols include polytetramethylene glycols obtained by the polymerization of tetrahydrofuran.

In an example, the polyol is a polyether polyol that is capped. The term "capped", as used herein, means that one or more terminals of the polyether polyol is occupied by an alkylene oxide group, for example. In an example, the polyether polyol is capped with ethylene oxide. In other examples, the polyether polyol is capped with ethylene oxide, propylene oxide, butylene oxide, and combinations thereof.

In one example, the polyol is a polyether polyol having an $M_w$ of from about 100 to about 10,000. In yet another example, the polyol is a polyether polyol having an $M_w$ of from about 400 to about 4,000. In still another example, the polyol is a polyether polyol having an $M_w$ of from about 900 to about 3.000.

Suitable polyester polyols include hydroxyl-terminated reaction products of polyhydric alcohols, polyester polyols obtained by the polymerization of lactones, e.g. caprolactone, in conjunction with a polyol, and polyester polyols obtained by the polymerization of hydroxy carboxylic acids, e.g. hydroxy caproic acid. Polyesteramide polyols, polythioether polyols, polyester polyols, polycarbonate polyols, polyacetal polyols, polycaprolactone, and polyolefin polyols may also be used.

In some preferred embodiments, polytetrahydrofuran (polyTHF) is reacted with the isocyanate to form the isocyanate prepolymer. The polytetrahydrofuran is typically synthesized by the polymerization of tetrahydrofuran. One or more types of the polytetrahydrofuran can be reacted to form the isocyanate prepolymer. The polytetrahydrofuran is also known in the art as poly(tetramethylene ether) glycol or poly(tetramethylene oxide) and, in some embodiments, has the following general structure:

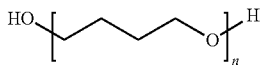

wherein n is an integer of from about 1 to about 100, alternatively from about 5 to about 75, alternatively from about 5 to about 50, alternatively from about 5 to about 20. Alternatively, in such embodiments, the polyTHF can have a weight average molecular weight of from about 225 to about 3000, alternatively from about 400 to about 2000, alternatively from about 225 to about 275, alternatively from about 625 to about 675, alternatively from about 950 to about 1050, alternatively from about 1750 to about 1850, alternatively from about 1950 to about 2050, alternatively from about 2800 to about 3000, g/mol. In these embodiments, the polyol can have a hydroxyl number of from about 30 to about 1000, alternatively from about 498 to about 537.4, alternatively from about 408 to about 498.7, alternatively from about 166.2 to about 179.5, alternatively from about 106.9 to about 118.1, alternatively from about 60.6 to about 64.1, alternatively from about 54.7 to about 57.5, alternatively from about 34.7 to about 40.1, mgKOH/g. Suitable polytetrahydrofurans/polyTHFs include, but are not limited to, polyTHFs commercially available from BASF Corporation of Wyandotte, Mich. under the trade name polyTHF®.

In other preferred embodiments, the polyol is (or comprises) a polyester polyol obtained by the polymerization of lactones, e.g. caprolactone, in conjunction with a polyol, and polyester polyols obtained by the polymerization of hydroxy carboxylic acids, e.g. hydroxy caproic acid. In one preferred embodiment, the polyol is or comprises a polyester polyol obtained by the polymerization of caprolactone, i.e., a caprolactone based polyol. In another preferred embodiment, the polyol is polyol formed from tetrahydrofuran and/or caprolactone. For example, in one embodiment, the polyol is or comprises a block copolymer comprising polymerized polytetrahydrofuran and polycapralactone blocks.

In certain examples, the polyol includes a natural oil polyol (NOP), which is also known as a biopolyol. In other words, the polyol is not a petroleum-based polyol, i.e., a polyol derived from petroleum products and/or petroleum by-products. In general, there are a few naturally occurring vegetable oils that include unreacted OH functional groups, and castor oil is typically commercially available and is produced directly from a plant source that has sufficient OH functional group content to make castor oil suitable for direct use as a polyol in urethane chemistry. Most, if not all, other NOPs require chemical modification of the oils directly available from plants. The NOP is typically derived from any natural oil, such as from a vegetable or nut oil. Examples of suitable natural oils include castor oil, and NOPs derived from soybean oil, rapeseed oil, coconut oil, peanut oil, canola oil, etc. Employing such natural oils can be useful for reducing environmental footprints.

In some examples, the polyol includes a graft polyol. In one example, the graft polyol is a polymer polyol. In other examples, the graft polyol is chosen from the group of polyharnstoff (PHD) polyols, polyisocyanate polyaddition (PIPA) polyols, and combinations thereof. Graft polyols may also be referred to as graft dispersion polyols or graft polymer polyols. In one example, the polyol includes a styrene-acrylonitrile graft polyol.

In some examples, the polyol includes a chain extender/curative. Suitable chain extenders may be selected from the group of, but are not limited to, diols, triols, and tetraols. Suitable diols include, but are not limited to, ethylene glycol, propylene glycol, butylene glycol, 1,4-butanediol (BDO), butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol; diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines including ethanol amine, aminopropyl alcohol, 2,2-dimethyl propanol amine, 3-aminocyclohexyl alcohol, and p-aminobenzyl alcohol; and combinations of any of the aforementioned chain extenders. Other suitable chain extenders include glycerine, trimethylolpropane (TMP), and pentaerythritol.

In some embodiments, polyamines can also be reacted to form the isocyanate prepolymer. That is, the reaction of the polyol and one or more polyamines (as well as the GNP) with the aromatic isocyanate is contemplated herein. The polyamine includes one or more amine (NH) functional groups. In this case, the isocyanate-reactive component typically includes at least two amine groups. Some examples of suitable polyamines include ethylene diamine, toluene diamine, diaminodiphenylmethane, polymethylene polyphenylene polyamines, aminoalcohols, and combinations thereof. Examples of aminoalcohols include ethanolamine, diethanolamine, triethanolamine, and combinations thereof. It is to be appreciated that any combination of the aforementioned polyols and/or polyamines can be reacted with the aromatic isocyanate to form the isocyanate prepolymer.

The Graphene Nano Platelets (GNP):

The isocyanate prepolymer comprises the GNP. More specifically, the isocyanate prepolymer comprises the reaction product of the aromatic isocyanate, the polyol, and the GNP.

One or more different types of GNP can be included in the isocyanate prepolymer or the polyurethane formed. In a typical embodiment, the GNP is an oxidized form of graphene, functionalized with oxygen-containing groups. Typically, the GNP have an average lateral dimension (x, y) of from about 1 to about 100 μm, an average through-plane dimension (z) of from about 5 to about 100 nm, and an oxygen content of from about 0 to about 10% by weight, based on the total weight of the GNP.

In some embodiments, the GNP can be described as have a single platelet structure, i.e., single atomic layer structure. In many typical embodiments, the GNP can be described as having a multi-platelet structure.

In some embodiments, functionalized GNP can be used to form the isocyanate prepolymer. There are many ways in which the GNP can be functionalized, depending on the desired application. For example, it is possible to substitute amines for the organic covalent functionalization of graphene to increase the dispersibility of the GNP. In some embodiments, the GNP is synthesized with one of four basic methods by Staudenmaier, Hofmann, Brodie, or Hummers.

In some embodiments, the GNP comprises a single-atomic layered material, comprising carbon and hydrogen. In such embodiments, the GNP could have the following general structure:

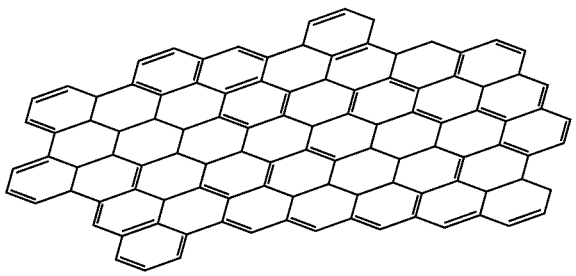 [SMILES: C1=CC2C3=Cc4cccc5c4C4C3=C3C6C7C4=C4C5=CC5=CC8=CC9=C%10C%11=C%12c%13c(ccc%14c%13=C%13C%15=C%16C%17=C%18C%19=C%20C%21C%22=C%23C(C5C4=C%22C7c4c%21c5c7c(cc%21ccc%22c%24c%21c7c4C6C%24C4C6C(=CC=CC%226)C(=C1)C2C34)C1C=CCC(=C1C%195)C%18CC1=C%17C%13C(C=C1)C=%14)C8C%10C(C%15%12)C%23C%16%20)C1CC=CC(=C9)C%111]

Figure 6:
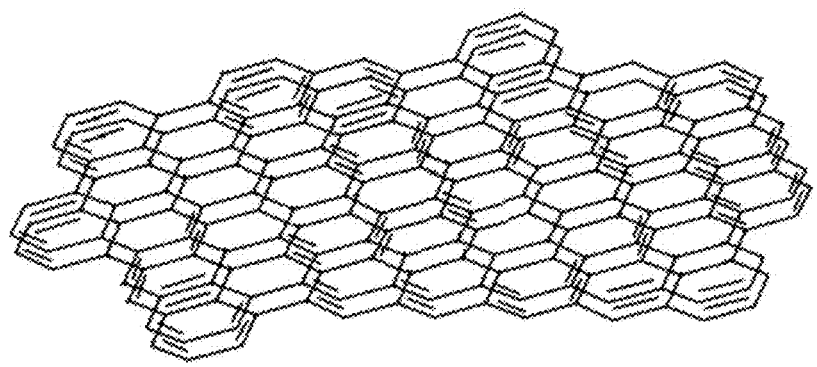
FIG. 6 illustrates an embodiment of the GNP including a double-atomic layered material comprising carbon and hydrogen.

In other embodiments, the GNP comprises a double-atomic layered material, comprising carbon and hydrogen. In such embodiments, the GNP could have the general structure illustrated in FIG. 6.

In various embodiments, the GNP comprises 1, 2, 3, 4, 5, 6, 7, 8, 9, 10, 11, 12, 13, 14, 15, or more atomic layers, comprising carbon and hydrogen. In one embodiment, the GNP comprises from 2 to 10, alternatively from 2 to 5 atomic layers comprising carbon and hydrogen.

In some embodiments, the GNP comprises a single-atomic layered material, comprising carbon, oxygen, and hydrogen. The GNP is an oxidized form of graphene, functionalized with oxygen-containing groups. In such embodiments, the GNP could have the following general structure:

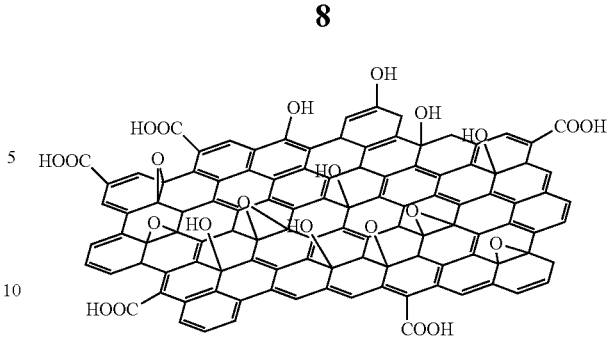

Figure 7:
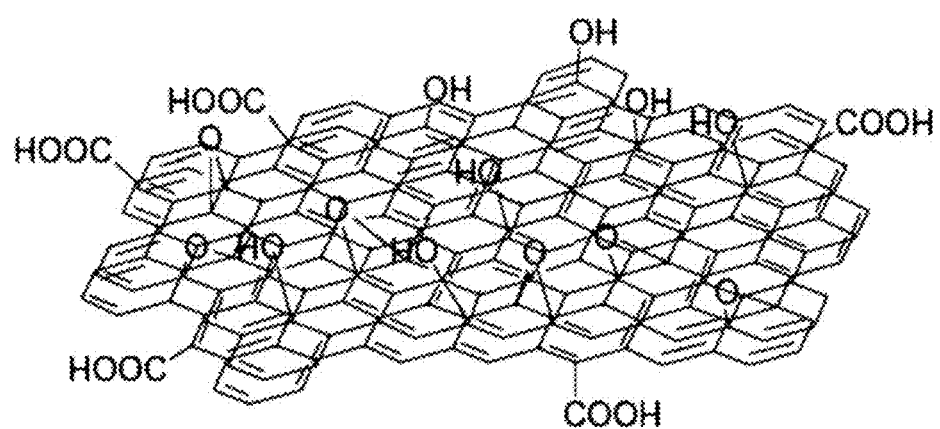
FIG. 7 illustrates an embodiment of the GNP including a double-atomic layered material, comprising carbon, oxygen, and hydrogen.

In other embodiments, the GNP comprises a double-atomic layered material, comprising carbon, oxygen, and hydrogen. The GNP is an oxidized form of graphene, functionalized with oxygen-containing groups. In such embodiments, the GNP could have the general structure illustrated in FIG. 7.

In various embodiments, the GNP comprises 1, 2, 3, 4, 5, 6, 7, 8, 9, 10, 11, 12, 13, 14, 15, or more atomic layers, comprising carbon, hydrogen, and oxygen. In one embodiment, the GNP comprises from 2 to 10, alternatively from 2 to 5 atomic layers comprising carbon, hydrogen, and oxygen.

In embodiments having a multi-layer structure, the oxygen content is typically active, i.e., located on an exterior surface of the GNP. Oxygen content within the layers can be shielded from interaction with the reactants used to form the isocyanate prepolymer or a polyurethane formed therewith.

In some embodiments, the GNP have: an oxygen content of from about 0.01 to about 10, alternatively from about 0.6 to about 7, alternatively from about 0.7 to about 5, alternatively from about 1 to about 3, % by weight based on 100 percent by weight of the GNP. Of course, the isocnatate prepolymer can include additional GNP which has an oxygen content of less than 0.01 or about 0% by weight based on 100 percent by weight of the additional GNP.

In many embodiments, the GNP have: an average lateral dimension (x, y) of from about 1 to about 100 μm, alternatively from about 3 to about 60, alternatively from about 5 to about 40, alternatively about 7 to about 25, μm; and/or an average through-plane dimension (z) of from about 1 to about 100, alternatively from about 5 to about 100, alternatively from about 1 to about 50, alternatively from about 5 to about 45, alternatively from about 6 to about 8, alternatively from about 12 to about 18, nm.

Additives:

Various additives can be included in, or used to form, the isocyanate prepolymer. Further, these additives can also be used to form the cast polyurethane elastomer, thermoplastic polyurethanes, and polyurethane foams described below. Suitable additives include, but are not limited to, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, acidifiers, thixotropic agents, transition metals, catalysts, blowing agents, surfactants, cross-linkers, inert diluents, and combinations thereof. Some particularly suitable additives include, but are not limited to, carbodiimides to reduce hydrolysis, hindered phenols and hindered amine light stabilizers to reduce oxidation and yellowing, benzotriazoles to increase UV light stabilization, glass fillers, and salts of sulfonic acid to increase antistatic properties of the TPU composition. The additive(s) may be included in any amount as desired by those of skill in the art.

The Isocyanate Prepolymer:

As is set forth above, the isocyanate prepolymer comprises the reaction product of the aromatic isocyanate, the polyol, and the GNP. In some embodiments, the aromatic isocyanate and the polyol are reacted at an isocyanate index of from about 1.5 to about 300, alternatively from about 2 to about 50. Isocyanate index, as is known in the art, is the ratio of NCO groups in the isocyanate to the OH groups in the polyols of the isocyanate-reactive composition.

In many embodiments, the isocyanate prepolymer has an isocyanate (NCO) content of from about 2 to about 50, alternatively from about 4 to about 30, alternatively from about 4 to about 35, alternatively from about 5 to about 20, alternatively from about 6 to about 16, % by weight. Determination of the % NCO contents on percent by weight is accomplished by a standard chemical titration analysis known to those skilled in the art.

In many embodiments, the isocyanate prepolymer includes GNP and has an isocyanate content from about 4 to about 30% by weight. In these embodiments, the GNP is reacted in an amount of 0.1 to about 20% by weight, based on the total weight of the isocyanate prepolymer. In such embodiments, the GNP can have an average lateral dimension (x, y) of from about 1 to about 100 μm, an average through-plane dimension (z) of from about 5 to about 100 nm, and an oxygen content of from about 0.01 to about 10% by weight, based on the total weight of the GNP.

In some embodiments, the isocyanate prepolymer is substantially free of any solvents known in the art. The terminology "substantially free," as used immediately above, refers to an amount of less than 10,000, less than 5.000, less than 1,000, less than 100, or less than 10, ppm based on the total weight of the isocyanate prepolymer.

In many embodiments, the isocyanate prepolymer includes GNP and has a weight average molecular weight (Mw) of from about 100 to about 5,000. In these embodiments, the GNP is reacted in an amount of 0.1 to about 20% by weight, based on the total weight of the isocyanate prepolymer. In such embodiments, the GNP can have an average lateral dimension (x, y) of from about 1 to about 100 μm, an average through-plane dimension (z) of from about 5 to about 100 nm, and an oxygen content of from about 0.01 to about 10% by weight, based on the total weight of the GNP.

In many embodiments, the isocyanate prepolymer has a weight average molecular weight (Mu) of from about 1,000 to about 5,000, alternatively of from about 200 to about 4,000, alternatively from about 300 to about 3,000, alternatively from about 400 to about 3.000, alternatively from about 500 to about 2,100, g/mol.

In various embodiments, the isocyanate prepolymer includes the aromatic isocyanate in an amount of from about 10 to about 98, alternatively from about 15 to about 85, alternatively from about 30 to about 50, % by weight, based on the total weight of the isocyanate prepolymer. Of course, the aromatic isocyanate is reacted into the isocyanate prepolymer and the amounts above are essentially the amounts set forth in the ranges above are the amounts of the aromatic isocyanate reacted to form the isocyanate prepolymer. That is, the ranges of the amount of the aromatic isocyanate above are, in the alternative, accurate on the basis of the total weight of the reactants reacted to form the isocyanate prepolymer. In other words, the aromatic isocyanate typically can have any value or range of values therebetween with in the range of from about 10 to about 98, % by weight, based on the total weight of the isocyanate prepolymer. Further, it is to be appreciated that more than one aromatic isocyanate may be included in the isocyanate prepolymer, in which case the total amount of all aromatic isocyanates included is within the above ranges.

In various embodiments, the isocyanate prepolymer includes the polyol in an amount of from about 2 to about 90, alternatively from about 15 to about 85, alternatively from about 40 to about 60, % by weight, based on the total weight of the isocyanate prepolymer. Of course, the polyol is reacted into the isocyanate prepolymer and the amounts above are essentially the amounts set forth in the ranges above are the amounts of the polyol reacted to form the isocyanate prepolymer. That is, the ranges of the amount of the polyol above are, in the alternative, accurate on the basis of the total weight of the reactants reacted to form the isocyanate prepolymer. The amount of the polyol included in the isocyanate prepolymer may vary outside of the ranges above, but is typically both whole and fractional values within these ranges. In other words, the polyol typically can have any value or range of values therebetween with in the range of from about 2 to about 90, % by weight, based on the total weight of the isocyanate prepolymer. Further, it is to be appreciated that more than one polyol may be included in the isocyanate prepolymer, in which case the total amount of all polyols included is within the above ranges.

In various embodiments, the isocyanate prepolymer includes the GNP in an amount of from about 0.1 to about 20, alternatively from about 0.1 to about 10, alternatively from about 0.1 to about 6, alternatively from about 0.1 to about 5, alternatively from about 0.5 to about 6, alternatively from about 0.5 to about 5, alternatively from about 0.5 to about 4, alternatively from about 0.5 to about 2, % by weight, based on the total weight of the isocyanate prepolymer. Of course, the GNP is reacted into the isocyanate prepolymer and the amounts above are essentially the amounts set forth in the ranges above are the amounts of the GNP reacted to form the isocyanate prepolymer. That is, the ranges of the amount of the GNP above are, in the alternative, accurate on the basis of the total weight of the reactants reacted to form the isocyanate prepolymer. The amount of the GNP included in the isocyanate prepolymer may vary outside of the ranges above, but is typically both whole and fractional values within these ranges. In other words, the GNP typically can have any value or range of values therebetween with in the range of from about 0.1 to about 10. % by weight, based on the total weight of the isocyanate prepolymer. Further, it is to be appreciated that more than one GNP may be included in the isocyanate prepolymer, in which case the total amount of all GNP included is within the above ranges.

The Method of Forming the Isocyanate Prepolymer:

A method of forming the isocyanate prepolymer is also disclosed herein. The method comprises the step of reacting the aromatic isocyanate, the polyol, and the GNP. The aromatic isocyanate, the polyol, and the GNP are just as described above. Further, the isocyanate prepolymer is also as described above.

The method of forming the isocyanate prepolymer is typically robust and can be performed with various orders of addition of reactants and with standard mix energies. In many embodiments, the method is conducted under inert conditions, e.g. under vacuum or with inert gas.

In many embodiments, the step of reacting the aromatic isocyanate, the polyol, and the GNP includes the sub-steps of adding the aromatic isocyanate into a reaction vessel, mixing the polyol and the GNP to form an isocyanate reactive mixture, and incrementally adding the isocyanate mixture to the reaction vessel. That is, in preferred embodiments, the aromatic isocyanate is first added to the reaction vessel and then the polyol and the GNP are added in increments of 5, alternatively 10, alternatively 15, alternatively 20, alternatively 30, alternatively 40, alternatively 50, alternatively 100, % by weight, based on the total weight of the polyol and the GNP reacted to form the isocyanate prepolymer. In some embodiments, the polyol and the GNP are metered in consistently (i.e. in a consistent uninterrupted stream) rather than added in incremental amounts.

In one embodiment, the total weight of the polyol reacted to form the isocyanate prepolymer is divided into a first portion comprising the polyol and a second portion comprising the remaining polyol and the GNP reacted to form the isocyanate prepolymer. That is, total weight of the polyol reacted to form the isocyanate prepolymer is divided into a first portion comprising virgin polyol and a second portion comprising pre-blended polyol and GNP (in a higher concentration) prior to batching. In such an embodiment, the step of reacting the aromatic isocyanate, the polyol, and the GNP is further defined as first mixing the isocyanate with the first portion (starting the batch with virgin polyol) to form a reaction mixture and subsequently mixing the second portion with the reaction mixture to form the isocyanate prepolymer or polyurethane (finishing the batch with mixture of polyol having a high concentration of GNP).

In another embodiment, the total weight of the polyol reacted to form the isocyanate prepolymer is pre-blended with the total weight GO GNP reacted to form the isocyanate prepolymer to form a pre-blended polyol GNP mixture. In such an embodiment, the step of reacting the aromatic isocyanate, the polyol, and the GNP is further defined as mixing the isocyanate with the pre-blended polyol GNP mixture. In this embodiment, the pre-blended polyol GNP mixture can be added in 1, 2, 3, 4, 5, 6, 7, 8, 9, 10, 11, or more increments, and can even be metered in continuously to form the isocyanate prepolymer or polyurethane.

In one embodiment, two or more polyols are reacted to form the isocyanate prepolymer or polyurethane. In this embodiment, a first polyol is pre-blended with the GNP in a desired concentration to form a first polyol/GNP pre-blend. Once the first polyol/GNP pre-blend is formed, the step of reacting the aromatic isocyanate, the polyol, and the GNP is further defined as first mixing the first polyol/GNP pre-blend with the isocyanate to form a reaction mixture, and subsequently mixing the second polyol (or remaining polyols if more than two polyols are used) with the reaction mixture to form the isocyanate prepolymer or the polyurethane. In an alternative embodiment, the step of reacting the aromatic isocyanate, the polyol, and the GNP is further defined as first mixing the second polyol (or remaining polyols if more than two polyols are used) with the isocyanate to form a reaction mixture, and subsequently mixing the first polyol/GNP pre-blend with the reaction mixture to form the isocyanate prepolymer or the polyurethane.

In another embodiment, two or more polyols are reacted to form the isocyanate prepolymer or polyurethane. In this embodiment, the total weight of the polyols reacted to form the isocyanate prepolymer is pre-blended with the total weight GO GNP reacted to form the isocyanate prepolymer to form a pre-blended polyol GNP mixture. In such an embodiment, the step of reacting the aromatic isocyanate, the polyols, and the GNP is further defined as mixing the isocyanate with the pre-blended polyol GNP mixture. In this embodiment, the pre-blended polyol GNP mixture can be added in 1, 2, 3, 4, 5, 6, 7, 8, 9, 10, 11, or more increments, and can even be metered in continuously to form the isocyanate prepolymer or the polyurethane.

Of course, in many embodiments, the method of forming the isocyanate prepolymer can be described as free of the step of sonication, exfoliation, or high speed dispersion. Likewise, the polyurethane or the isocyanate prepolymer described herein can be further described as comprising GNP which is not sonicated, exfoliated, or dispersed via high speed dispersion. Advantageously, additional steps such as those described above are not required to disperse the GNP in the isocyanate prepolymer or the polyurethane formed therefrom.

The method of forming the isocyanate prepolymer as well as the isocyanate prepolymer can be described as substantially free of, or free of, additional dispersants or processing aids. Advantageously, additional dispersants or processing aids are not required to disperse the GNP in the isocyanate prepolymer or the polyurethane formed therefrom.

The method of forming the isocyanate prepolymer includes GNP which is thoroughly dispersed in both the polyol and the isocyanate prepolymer. As such, the isocyanate prepolymer has (1) non-packing attributes: (2) stable viscosity over a broad range of temperatures, storage conditions, and times: and (3) stable isocyanate content (i.e. % NCO) over a broad range of temperatures, storage conditions, and times.

In a preferred embodiment, the step of reacting is substantially free of solvent. That is, the step of reacting may be substantially free from any solvents known in the art. The terminology "substantially free," as used immediately above, refers to an amount of typically less than 0.1, more typically of less than 0.01, and most typically of less than 0.001, % by weight, based on the total weight of the reactants reacted to form the isocyanate prepolymer.

The aromatic isocyanate may be reacted, to form the isocyanate prepolymer, in an amount of from about 10 to about 98, alternatively from about 15 to about 85, alternatively from about 30 to about 60, % by weight, based on the total weight of the reactants reacted to form the isocyanate prepolymer. The amount of the aromatic isocyanate which is reacted to form the isocyanate prepolymer may vary outside of the ranges above, but is typically both whole and fractional values within these ranges. In other words, the aromatic isocyanate typically can have any value or range of values therebetween with in the range of from about 10 to about 98% by weight, based on the total weight of the reactants reacted to form the isocyanate prepolymer. Further, it is to be appreciated that more than one aromatic isocyanate may be reacted to form the isocyanate prepolymer, in which case the total amount of all aromatic isocyanates reacted is within the above ranges.

The polyol may be reacted, to form the isocyanate prepolymer, in an amount of from about 2 to about 90, alternatively from about 15 to about 85, alternatively from about 15 to about 70, % by weight, based on the total weight of the reactants reacted to form the isocyanate prepolymer. The amount of the polyol which is reacted to form the isocyanate prepolymer may vary outside of the ranges above, but is typically both whole and fractional values within these ranges. In other words, the polyol typically can have any value or range of values therebetween with in the range of from about 40 to about 60, % by weight, based on the total weight of the reactants reacted to form the isocyanate prepolymer. Further, it is to be appreciated that more than one polyol may be reacted to form the isocyanate prepolymer, in which case the total amount of all polyols reacted is within the above ranges.

The GNP may be reacted, to form the isocyanate prepolymer, in an amount of from about 0.1 to about 20, alternatively from about 0.1 to about 10, alternatively from about 0.5 to about 5, alternatively from about 1 to about 5, % by weight, based on the total weight of the reactants reacted to form the isocyanate prepolymer. The amount of the GNP which is reacted to form the isocyanate prepolymer may vary outside of the ranges above, but is typically both whole and fractional values within these ranges. In other words, the GNP typically can have any value or range of values therebetween with in the range of from about 0.1 to about 10, % by weight, based on the total weight of the reactants reacted to form the isocyanate prepolymer. Further, it is to be appreciated that more than one GNP may be reacted to form the isocyanate prepolymer, in which case the total amount of all GNP reacted is within the above ranges.

Various alternative methods are contemplated herein. In one embodiment, the method includes the step of reacting the aromatic isocyanate, a polyol (e.g. polytetrahydrofuran), the GNP, and second polyol (e.g. a curative such as BDO) simultaneously. In such an embodiment, the isocyanate prepolymer is formed insitu and a cast elastomer or a thermoplastic polyurethane is subsequently formed therefrom.

The Polyurethane:

The subject disclosure also provides a polyurethane comprising the reaction product of an isocyanate component, a polyol component, and the GNP. In addition to the isocyanate component and the polyol component, curatives and additives, as are described herein, may also be utilized to from the polyurethane.

The isocyanate component may include any type of isocyanate known to those skilled in the art including any of the isocyanates disclosed above. The isocyanate component may include one or more types of isocyanate. The isocyanate may be a polyisocyanate having two or more functional groups. e.g. two or more NCO functional groups. Suitable isocyanates include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate component may include an isocyanate prepolymer such as, but not limited to, the isocyanate prepolymer descried herein. The isocyanate prepolymer is typically the reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable amino alcohols include ethanolamine, diethanolamine, triethanolamine, and combinations thereof.

In one embodiment, the polyurethane comprises the reaction product of (1) an isocyanate prepolymer comprising the reaction product of the isocyanate component comprising an aromatic isocyanate, the polyol component (e.g. the isocyanate prepolymer described herein), and (2) the graphene nano platelets; and at least one of a polyol, a diol, and an amine.

The polyol component typically includes one or more polyols having one or more OH functional groups, typically at least two OH functional groups. The polyol component may include any type of polyol known to those skilled in the art including any of the polyols disclosed above. In addition to, or in lieu of, the OH functional group(s), the polyol component can include isocyanate-reactive moieties having one or more NH functional groups. In various embodiments, polyol is selected from the group of polyether polyols, polyester polyols, polyether/ester polyols, silicone polyols, fluorinated polyols, biopolyols, polytetrahydrofuran, and combinations thereof; however, other polyols may also be employed. In one embodiment, the polyol comprises a polyether polyol. In another embodiment, the polyol comprises a polyester polyol. In yet another embodiment, the polyol is formed from tetrahydrofuran and/or caprolactone.

The GNP are just as described above. The GNP may be reacted to form the polyurethane in an amount of from about 0.1 to about 20, alternatively from about 0.1 to about 10, alternatively from about 0.5 to about 5, alternatively from about 1 to about 5, % by weight, based on the total weight of the reactants reacted to form the polyurethane. The amount of the GNP which is reacted to form the polyurethane may vary outside of the ranges above, but is typically both w hole and fractional values within these ranges. In other words, the GNP typically can have any value or range of values therebetween within the range of from about 0.1 to about 10, % by weight, based on the total weight of the reactants reacted to form the polyurethane. Further, it is to be appreciated that more than one GNP may be reacted to form the polyurethane, in which case the total amount of all GNP reacted is within the above ranges.

The polyurethane has a hard block content of from about 50 to about 95 molar %. The polyurethane has a hard block content as is described in detail below. Further, the polyurethane can be a polyurethane cast elastomer, a thermoplastic polyurethane elastomer, a polyurethane foam, or a polyurethane adhesive described below. To this end, the polyurethane cast elastomers, the thermoplastic polyurethane elastomers, the polyurethane foams, and the polyurethane adhesives as described below can be formed with the GNP in various embodiments that do not utilize incorporation of the GNP into the isocyanate prepolymer.

Cast Elastomers:

A cast elastomer and a method of forming the cast elastomer are also disclosed herein. The cast elastomer is formed from a two-component polyurethane system comprising a first part comprising the isocyanate prepolymer and a second part comprising a polyol (the polyol is described previously). The aromatic isocyanate, the polyol, and the additives as described can be used in various combinations to form the cast elastomer.

The method of forming the cast elastomer may include one or more of the steps disclosed in the method of forming the isocyanate prepolymer, and also includes the step of reacting the isocyanate prepolymer with the polyol to form the cast elastomer. In various embodiments of the method of forming the cast elastomer, the isocyanate prepolymer and the polyol are reacted at an isocyanate index of from about 90 to about 120, alternatively about 95 to about 110, alternatively about 98 to about 105.

The method of forming the cast elastomer may also include the step of heating the isocyanate prepolymer to a temperature of from about 20 to about 150, alternatively about 50 to about 130, ° C. The step of heating the isocyanate prepolymer can be conducted prior to or simultaneous with the step of reacting the isocyanate prepolymer with the polyol to form the cast elastomer.

In some embodiments the method of forming the cast elastomer includes an additional step of post curing the cast elastomer. For example, the cast elastomer for a sufficient amount of time at a temperature of from about 100 to about 130° C.

In some preferred embodiments, the isocyanate prepolymer is reacted with an aliphatic diol having from about 2 to about 12 carbon atoms to form the cast elastomer. In such embodiments, the cast elastomer formed has a hard block content of from about 50 to about 95, alternatively from about 70 to about 90, molar % based on the total equivalent of the aliphatic diol divided by the total equivalent of NCO used to form the cast elastomer.

In other embodiments, the elastomer (cast elastomer or even a TPU) comprises the reaction product of (1) the isocyanate prepolymer as set forth above, (2) an aliphatic diol having from 2 to 12 carbon atoms and/or an amine as set forth above, and, (3) optionally one or more polyols as described above. In such embodiments, the cast elastomer formed has a hard block content of from about 50 to about 95, alternatively from about 70 to about 90, molar % based on the total equivalent of the aliphatic diol (or amine) divided by the total equivalent of NCO used to form the cast elastomer.

In yet other embodiments, the isocyanate prepolymer is reacted with aromatic diol having from 8 to 16 carbon atoms, alternatively from 8 to 24 carbon atoms, to form the cast elastomer. In such embodiments, the cast elastomer formed has a hard block content of from about 50 to about 95, alternatively from about 70 to about 90, molar % based on the total equivalent of the aromatic diol divided by the total equivalent of NCO used to form the cast elastomer.

In other embodiments, the isocyanate prepolymer is reacted with any combination of polyols, chain extenders, and curatives. Suitable chain extenders and curatives may be selected from the group of, but are not limited to, diols, triols, and tetraols. Suitable polyols, chain extenders, and curatives are described above.

Of course, the isocyanate prepolymer can be reacted with various combinations of diols, triols, and polyols to form a cast elastomer having a hard block content of from about 50 to about 95, alternatively from about 70 to about 90, molar % based on the total equivalent of the aliphatic diol divided by the total equivalent of NCO used to form the cast elastomer.

The hard block content of the polyurethane, be it the polyurethane described above or a polyurethane cast elastomer, a TPU, a polyurethane foam, or any other type of polyurethane, is described immediately below. That is, this disclosure related to hard block content applies to all types of polyurethane disclosed herein.

The hard block content is the portions or polymer domains of the polyurethane with a higher degree of hydrogen bonding interaction. These polymer domains are formed from the phase separation of a chain extender, e.g. a short-chain di-functional chain extender, and the isocyanate, which form the hard block. The remaining portions of the polyurethane typically comprise long-chain polyol and are referred to as soft-segment. The interactions between the hard block (with a higher degree of hydrogen bonding hydrogen) and the soft segments form semi-crystalline portions or domains in the polyurethane, which provide the rigidity and physical resistance to forces acting on the polymer, including modulus and tear properties. The percentage of hard block within a polyurethane is calculated from the molar equivalence of the total isocyanate groups contributed by the isocyanate in the urethane polymer to the hydroxyl equivalence of the chain extender in the urethane polymer. The interactions between the GNP and the isocyanate in the isocyanate prepolymer allow for the GNP to act as a nucleation site for the formation of hard block the polyurethane is formed. By increasing the free NCO in the prepolymer, there becomes the potential to form more hard block content in the polymer matrix. In turn, more hard block content allows for more of the GNP to act as a nucleation agent. This increases the potential effective loading of the GNP into the prepolymer by having more potential hard segment interaction to form with the GNP. The examples below show that, the hard block content can be increased through percent NCO and increasing the level of GNP. It is believed that there is a direct connection between the increase in hard block content, and the effective amount of GNP in the polyurethane. To this end, use of a minimal amount of GNP in the isocyanate prepolymer increases the hard block content and/or the quality of the hard block content of the polyurethane. This increase in hard block content improves many of the physical properties of the polyurethane without negatively impacting other properties of the polyurethane. For example, the interaction between the hard block domains and the GNP within the polyurethane provides increased modulus and tear resistance while maintaining tensile and elongation properties. Further, the interaction between the hard block domains and the GNP within the polyurethane provides excellent processing properties (processability) and increases thermal properties including onset to melt, melt temperature, and the enthalpy of melting. Such rheological, physical, and thermal properties can be attributed to an increased crystallinity of the hard block domains in the polyurethane.

FIGS. 1A-C and 2A-C are atomic-force microscopy (AFM) images of polyurethane showing hard block content. AFM, sometimes referred to as scanning-force microscopy (SFM), is a very-high-magnification type of scanning probe microscopy with demonstrated magnification on the order of fractions of a nanometer.

Figure 1B:
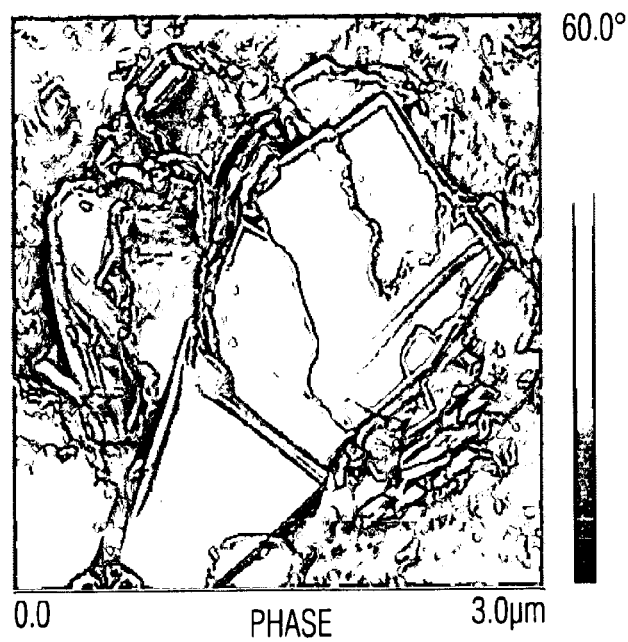
FIG. 1B is a second, higher magnification AFM image of the polyurethane of FIG. 1A.
Figure 1C:
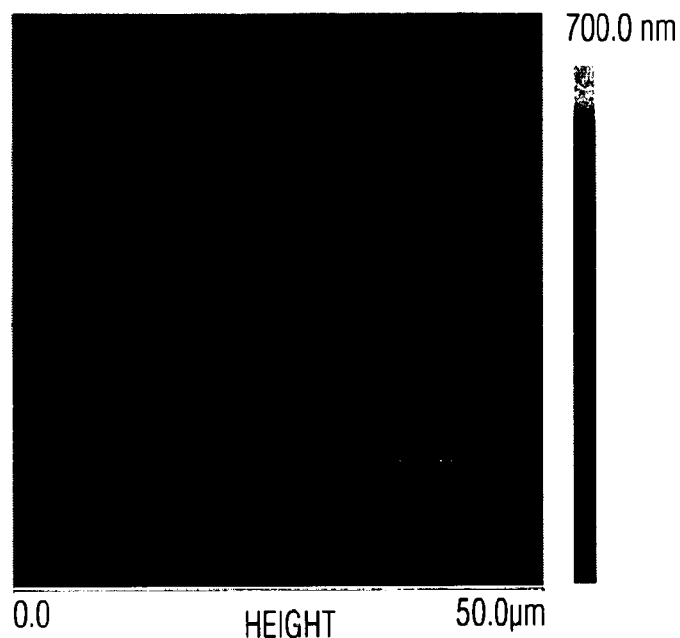
FIG. 1C is an AFM image of a polyurethane which is not formed with an isocyanate prepolymer comprising graphene nano platelets for comparison with the AFM image of FIG. 1A.

Referring now to FIG. 1A, an atomic-force microscopy (AFM) image of a polyurethane formed with an isocyanate prepolymer comprising graphene GNP and polytetrahydrofuran. The GNP is characterized by its white color and the hard block content, which is organized around the GNP, is characterized by its lighter color. The soft segment content is characterized by the darkest color. FIG. 1B is a second, higher magnification atomic-force microscopy (AFM) image of the polyurethane of FIG. 1A. FIG. 1C is an atomic-force microscopy (AFM) image of a comparable polyurethane. The polyurethane of FIG. 1C is formed with polytetrahydrofuran, but not formed with an isocyanate prepolymer comprising graphene nano platelets, and is included herein for comparison with the image of FIG. 1A. Notably, the hard block segments of the polyurethane of FIG. 1C are not as well defined as the hard block segments of the polyurethane of FIG. 1A. The well-defined hard block segments of the polyurethane of FIG. 1A are organized around the GNP platelets. The polyurethane of FIG. 1A is formed in accordance with the subject disclosure and the well-defined hard block content of the polyurethane of FIG. 1A is believed to impart excellent physical properties on polyurethane of FIG. 1A.

Figure 2A:
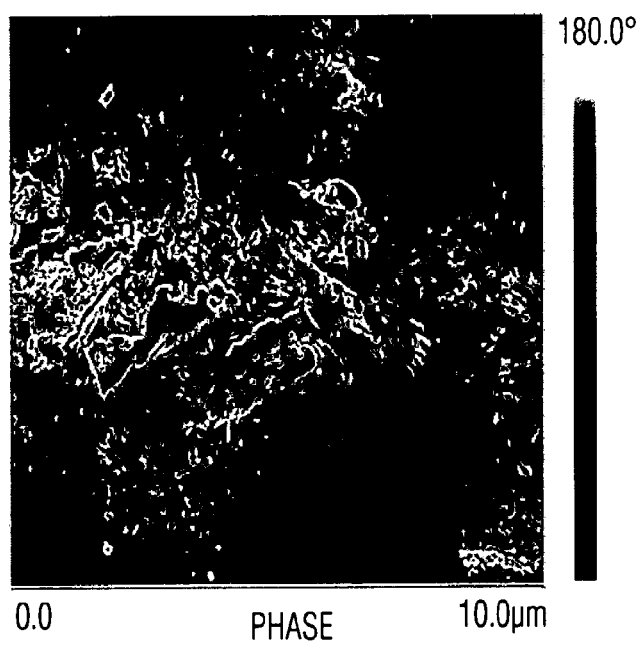
FIG. 2A is an AFM image of a polyurethane formed with an isocyanate prepolymer comprising graphene nano platelets.
Figure 2B:
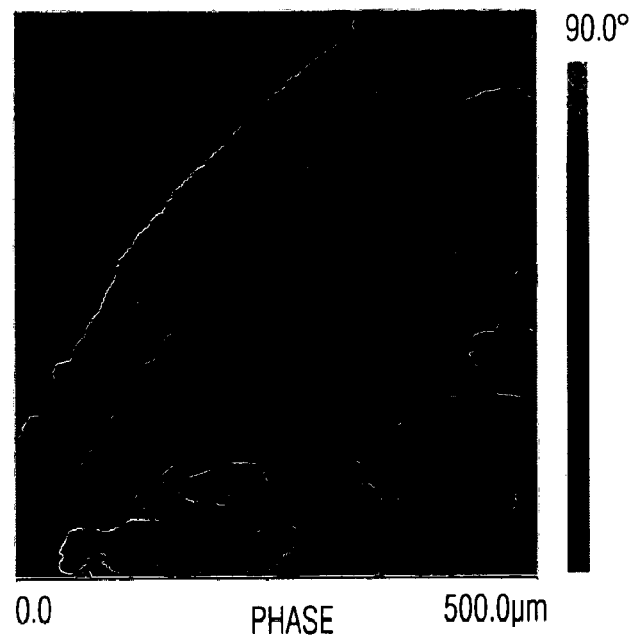
FIG. 2B is a second, higher magnification AFM image of the polyurethane of FIG. 2A.
Figure 2C:
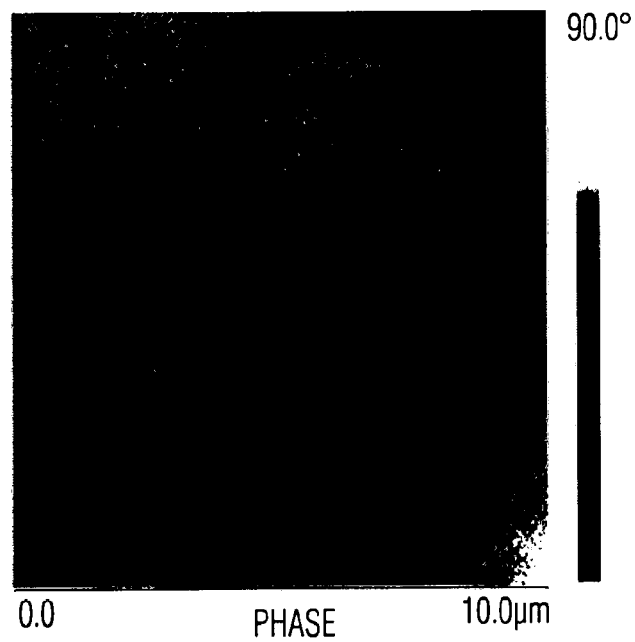
FIG. 2C is an AFM image of a polyurethane which is not formed with an isocyanate prepolymer comprising graphene nano platelets for comparison with the AFM image of FIG. 2A.

Referring now to FIG. 2A, an atomic-force microscopy (AFM) image of a polyurethane formed with an isocyanate prepolymer comprising graphene GNP and polyester polyol. The GNP is characterized by its white color and the hard block content, which is organized around the GNP, is characterized by its lighter color. The soft segment content is characterized by the darkest color. FIG. 2B is a second, higher magnification atomic-force microscopy (AFM) image of the polyurethane of FIG. 2A. FIG. 2C is an atomic-force microscopy (AFM) image of a comparable polyurethane. The polyurethane of FIG. 2C is formed with polyester polyol, but not formed with an isocyanate prepolymer comprising graphene nano platelets, and is included herein for comparison with the image of FIG. 2A. Notably, the hard block segments of the polyurethane of FIG. 2C are not as well defined as the hard block segments of the polyurethane of FIG. 2A. The well-defined hard block segments of the polyurethane of FIG. 2A are organized around the GNP platelets. The polyurethane of FIG. 2A is formed in accordance with the subject disclosure and the well-defined hard block content of the polyurethane of FIG. 2A is believed to impart excellent physical properties on polyurethane of FIG. 2A.

In many embodiments the cast elastomer has: a Shore A Hardness of from about 60 to about 99, alternatively from about 80 to about 99, pts as determined by ASTM D2240; a Shore D Hardness of from about 16 to about 85 pts as determined by ASTM D2240; a specific gravity of from about 1.05 to about 1.35, alternatively from about 1.05 to about 1.25, alternatively from about 1.05 to about 1.15, $g/cm^3$; a tensile strength of from about 100 to about 40,000, alternatively from about 2,000 to about 10,000, psi at 23° C. as determined by ASTM D412; a Taber abrasion resistance of from about 2 to about 100, alternatively from about 10 to about 100, alternatively from about 2 to about 50, and more typically from about 2 to about 30, mg when tested in accordance with ASTM D4060; and/or a tear strength of greater than about 300, alternatively of from 300 to 2000, lb-f/$in^2$ at 25° C. as determined by ASTM D624.

The isocyanate prepolymer can be reacted with various reactants to form cast elastomers suitable for specific applications. In other words, reactants can be chosen to optimize the performance properties the cast elastomer formed for a particular use.

The market for the cast elastomers includes various industrial sectors such as wood and wood products, paper, paper industry, electronics, shipbuilding, automotive, and other industries. Use of cast elastomers throughout transportation, building, commercial product, and other industries is known in the art. In various embodiments, the isocyanate prepolymer can be reacted to form a cast elastomer suitable rollers, castor, wheels, millable casting, belts, cast, sheet, track, seals, and gaskets, scraper blades, screens, sieves, tubing, sprockets, gears, couplings, coatings, mold forms, adhesives, and many other products.

Thermoplastic Polyurethane (TPU):

A cast elastomer and a method of forming the thermoplastic polyurethane (TPU) are also disclosed herein. The TPU is formed from a two-component polyurethane system comprising a first part comprising the isocyanate prepolymer and a second part comprising a polyol (the polyol is described previously). The aromatic isocyanate, the polyol, and the additives as described can be used in various combinations to form the TPU.

The method of forming the TPU may include one or more of the steps disclosed in the method of forming the isocyanate prepolymer, and also includes the step of reacting the isocyanate prepolymer with the polyol to form the TPU. The step of reacting may be further defined as combining via any method known in the art including, but not limited to, in a reaction vessel, direct extrusion, belt extrusion, reaction extrusion, reaction injection molding, vertical mixing, horizontal mixing, feed mixing, and combinations thereof. In one embodiment, the step of combining is further defined as compounding on a device such as a single or twin-screw extruder.

Subsequent to the step of combining, the method of forming the TPU may also include the step of pelletizing, dicing, or granulating the TPU. For example, the compounded TPU may be pelletized with an underwater pelletizer or a strand pelletizer.

Although a wide variety of TPUs can be formed by varying the structure and/or molecular weight of the reactants used to form TPUs, the TPU of the subject disclosure is engineered for use with the isocyanate prepolymer. The TPU is typically selected from the group of polyester-based TPUs, polyether-based TPUs, and combinations thereof. For purposes of the subject disclosure, a "polyester-based" TPU is a TPU that includes at least two ester groups present therein and/or is formed from a reactant that includes a polyester bond. Likewise, also for purposes of the instant application, a "polyether-based" TPU is a TPU that includes at least two ether groups present therein and/or is formed from a reactant that includes a polyether bond. It is to be appreciated that for both polyester-based and polyether-based TPUs, reactants can be used to form the TPUs that do not include polyester or polyether groups therein. Further, it is also to be appreciated that suitable TPUs for purposes of this disclosure are not limited to polyester-based or polyether-based TPUs, and that other TPUs may also be suitable that do not include ether or ester groups present therein.

In one embodiment, the TPU is the polyester-based TPU and includes the reaction product of the isocyanate prepolymer and the polyester polyol to form the TPU. In a preferred embodiment, the isocyanate prepolymer is reacted with the polytetrahydrofuran (polyTHF) to form the TPU.

In many embodiments the TPU has: a weight average molecular weight of greater than about 75,000, more typically from about 75.000 to about 750,000, and most typically from about 100,000 to about 600,000, g/mol: a specific gravity of from about 1.05 to about 1.35, alternatively from about 1.05 to about 1.25, alternatively from about 1.05 to about 1.15, $g/cm^3$; a tensile strength of from about 100 to about 40,000, alternatively from about 2,000 to about 10,000, psi at 23° C. as determined by ASTM D412; a Taber abrasion resistance of from about 2 to about 100, alternatively from about 10 to about 100, alternatively from about 2 to about 50, and more typically from about 2 to about 30, mg when tested in accordance with ASTM D4060; and/or a tear strength of greater than about 300, alternatively of from 300 to 2000, lb-f/$in^2$ at 25° C. as determined by ASTM D624.

The isocyanate prepolymer can be reacted with various reactants to form TPUs suitable for specific applications. In other words, reactants can be chosen to optimize the performance properties the TPU formed for a particular use. Use of TPUs throughout transportation, building, commercial product, and other industries is known in the art. In various embodiments, the isocyanate prepolymer can be reacted to form a TPU suitable for products such as footwear, cable and wire, hose and tube, film and sheet, moldings, textiles, coatings, adhesives, and other products.

Polyurethane Foams:

A polyurethane foam and a method of forming the polyurethane foam are also disclosed herein. As is known in the art, the polyurethane foam is formed from an exothermic reaction of an isocyanate-reactive resin composition and an isocyanate in the presence of a blowing agent. The polyurethane foam of the subject disclosure formed with, is the reaction product of, and/or comprises the isocyanate prepolymer and/or the polyurethane disclosed herein. The isocyanate-reactive resin composition, the isocyanate, and the blowing agent, collectively known as a polyurethane system, are selected to optimize application efficiency and performance properties of the polyurethane foam article for a particular use. To form the polyurethane foam article, the isocyanate-reactive resin composition and the isocyanate are typically mixed in the presence of the blowing agent to form a reaction mixture and the reaction mixture is applied as required for a particular use. The reaction mixture can be applied with an application technique, such as spraying, pouring, or injection molding. Like the components of the polyurethane system, the particular application technique is selected to optimize application efficiency and the performance properties of the polyurethane foam article for a particular use. Use of polyurethane foam articles throughout transportation, building, commercial product, and other industries is known in the art. In various embodiments, the isocyanate prepolymer can be reacted to form polyurethane foams suitable for many different products.

Polyurethane Adhesives:

A polyurethane adhesive and a method of making a polyurethane adhesive is disclosed herein. The polyurethane adhesive is formed with, is the reaction product of, and/or comprises the isocyanate prepolymer and/or the polyurethane disclosed herein. That is, the polyurethane adhesive comprises the GNP as is described above. The polyurethane adhesive can be a hot melt adhesive. In some embodiments, the polyurethane adhesive can be 1-part liquid adhesive. Alternatively, the polyurethane adhesive can be a 2-part (or 2-K) adhesive. In some embodiments, the polyurethane adhesive can be solvent based adhesive. The market for the polyurethane adhesive includes various industrial sectors such as wood and wood products, paper, paper industry, electronics, shipbuilding, automotive, and other industries.

In one embodiment, a 2-K adhesive includes a first part and a second part. In a typical embodiment, the first part includes at least one isocyanate reactive component (e.g. one or more polyols, diols, or even amines) and other additives. The second part includes an isocyanate (e.g. one or more of the isocyanates described above).

In another embodiment, a hot melt adhesive includes the reaction product of the isocyanate, the polyol, and the GNP described above.

In another embodiment, an adhesive for tire construction is disclosed. In another embodiment, a composite article, such as a tire, is disclosed. The pneumatic tire may be a race tire, passenger tire, aircraft tire, agricultural, earthmover, off-the-road, truck tire, and the like. In one embodiment, the tire is a passenger or truck tire. The tire may also be a radial or bias. Use of the adhesive may be accomplished with various methods. In one embodiment, the composite article including the adhesive may be applied to a rubber plycoat of a tire carcass ply, with the adhesive of the composite article (inner liner in this embodiment) in direct contact with the rubber plycoat.

The following examples are meant to illustrate the disclosure and are not to be viewed in any way as limiting to the scope of the disclosure.

EXAMPLES

Examples 1-3

The isocyanate prepolymers of Examples 1-3 include GNP and are formed in accordance with the subject disclosure. The isocyanate prepolymer of Comparative Example 1 is formed without GNP for comparative purposes. The isocyanate prepolymers of Examples 1-3 have a calculated weight average molecular weight (Ma) of approximately 1150 g/mol based on an NCO content of 7.3% by weight. The isocyanate prepolymers of Examples 1-3 are a black, viscous liquid.

The isocyanate prepolymers of Examples 1-3 are reacted with Curative A to form the cast elastomers of Examples 1-3. The isocyanate prepolymer of Comparative Example 1 is also reacted with Curative A to form the cast elastomer of Comparative Example 1. The cast elastomers of Examples 1-3 are formed into molded articles. The amounts of all components used to form Examples 1-3 are set forth in Table 1 below with all amounts in % by weight based on the total weight of the reactants reacted to form the cast elastomers of Examples 1-3.

To form the isocyanate prepolymers of Examples 1-3 and the cast elastomers of Examples 1-3, the GNP is mixed with the pTHF polyol. This mixture is reacted with the MDI in the presence of stabilizing additive and curative (at less than 0.5% by weight based on the total weight of the reactants) to produce the prepolymer. The prepolymer is reacted with the curative to produce a cast elastomer. The cast elastomer may be pelletized, and extruded into a mold to produce a TPU.

TABLE 1

| Component | Description | Comparative Example 1 | Example 1 | Example 2 | Example 3 |
|---|---|---|---|---|---|
| Isocyanate Prepolymer | | | | | |
| Isocyanate A | MDI | 28.4 wt. % | 28.73 wt. % | 28.68 wt. % | 28.94 wt. % |
| Polyol A | pTHF, 2000 g/mol | 64.79 wt. % | 62.40 wt. % | 62.46 wt. % | 62.10 wt. % |
| GNP | ≤1% Oxygen Content (OC), 10 µm lateral dimension (x, y) (PS) | — | 1.86 wt. % | — | — |
| GNP | ≤1% OC, 7 µm PS | — | — | 1.86 wt. % | — |
| GNP | ≤3 OC, 5 µm PS | — | — | — | 1.86 wt. % |
| Isocyanate Prepoymer Properties | | | | | |
| NCO Content | % by Weight | 7.28 | 7.52 | 7.5 | 7.62 |
| Molecular Weight($M_n$) | g/mol | 1,154 | 1,118 | 1,120 | 1,102 |

TABLE 1-continued

| Component | Description | Comparative Example 1 | Example 1 | Example 2 | Example 3 |
|---|---|---|---|---|---|
| Cast Elastomer | | | | | |
| Curative A | BDO | 6.80 wt. % | 7.01 wt. % | 6.99 wt. % | 7.10 wt. % |
| Cast Elastomer Properties | | | | | |
| Comp Set (Cd) 25% (%) | ASTM D395 | 6.813 | 9.58 | 11.01 | 20.027 |
| Bayshore Resilience (%) | ASTM D2632 | 56.667 | 57.667 | 57 | 58 |
| Shore A | ASTM D2240 | 85.667 | 90 | 89.667 | 87 |
| Split Tear (ppi) | ASTM D624 | 111.077 | 169.94 | 173.697 | 157.783 |
| Stress at 10% (psi) | ASTM D412/ Die C | 301.9 | 590.96 | 509.66 | 490.24 |
| Stress at 100% (psi) | ASTM D412/ Die C | 849.02 | 1169.8 | 1105.18 | 1095.12 |
| Stress at 200% (psi) | ASTM D412/ Die C | 1201.78 | 1460.96 | 1403.02 | 1401.18 |
| Stress at 50% (psi) | ASTM D412/ Die C | 658.5 | 993.9 | 928.7 | 904.3 |
| Break Elongation (%) | ASTM D412/ Die C | 484.4 | 519.66 | 503.78 | 489.54 |
| Peak Stress (psi) | ASTM D412/ Die C | 4347.354 | 4576.926 | 4201.384 | 4421.882 |
| Young's Modulus (psi) | ASTM D412/ Die C | 3654.26 | 9364.2 | 7371.86 | 7039.64 |

Referring now to Table 1, Examples 1-3, which include GNP, exhibit excellent physical properties over Comparative Example 1, which does not include GNP. For example, Bayshore Resilience is maintained over Comparative Example 1, hardness is increased over Comparative Example 1 by up to 4.33 points), tear strength is increased over Comparative Example 1 (by up to 150%), stress at elongation is increased over Comparative Example 1 (from 10-200%), elongation at brake is maintained with the inclusion of GNP and increased cross-linking, peak stress is maintained with the inclusion of graphene nano platelets and increased cross-linking, and Young's modulus is increased over Comparative Example 1 (by up to Up to 256%). As such, Examples 1-3 all exhibit improved properties.

From the perspective of lateral dimension (x, y), Example 1, comprising GNP having an average lateral dimension (x, y) of 10 μm generally exhibits the greatest improvement in modulus with elongation, Young's modulus, and tear, while maintaining ultimate elongation and tensile strength over Comparative Example 1. Example 2 exhibits similar improvements (to a lesser extent than Example 1) in modulus with elongation, Young's modulus, and tear, over Comparative Example 1. Example 3 exhibits similar improvements (to a lesser extent than Example 2) in modulus with elongation, Young's modulus, and tear, over Comparative Example 1. To this end, isocyanate prepolymers including GNP having an average lateral dimension (x, y) range of from about 7 to about 10 μm form cast elastomers having excellent physical properties.

Examples 4-7

The isocyanate prepolymers of Examples 4-7 are formed in accordance with the subject disclosure. The isocyanate prepolymers of Examples 4-7 are a black, viscous liquid.

The isocyanate prepolymers of Examples 4-7 are reacted with Curative A to form the cast elastomers of Examples 4-7. The cast elastomers of Examples 4-7 are formed into black, molded articles. The amounts of all components used to form Examples 4-7 are set forth in Table 2 below with all amounts in % by weight based on the total weight of the reactants reacted to form the cast elastomers of Examples 4-7.

To form the isocyanate prepolymers of Examples 4-7 and the cast elastomers of Examples 4-7, the GNP is mixed with the pTHF polyol. This mixture is reacted with the MDI to produce the prepolymer. The prepolymer is reacted with the curative in the presence of stabilizing and defoaming additives and a curative (at less than 0.5% by weight based on the total weight of the reactants) to produce a cast elastomer. The cast elastomer may be pelletized, and extruded into a mold to produce a TPU.

TABLE 2

| Component | Description | Example 4 | Example 5 | Example 6 | Example 7 |
|---|---|---|---|---|---|
| Isocyanate Prepolymer | | | | | |
| Isocyanate | MDI, | 25.95 wt. % | 28.40 wt. % | 31.55 wt. % | 32.90 wt. % |
| Polyol A | pTHF 2000 | 66.28 wt. % | 62.86 wt. % | 58.83 wt. % | 30.85 wt. % |
| Polyol B | pTHF 1000 | — | — | — | 26.74 wt. % |
| GNP | ≤1% OC, 10 μm PS | 1.88 wt. % | 1.86 wt. % | 1.83 wt. % | 1.85 wt. % |
| Isocyanate Prepolymer Properties | | | | | |
| NCO Content | % by Weight | 6.27 | 7.37 | 8.87 | 8.1 |

TABLE 2-continued

| Component | Description | Example 4 | Example 5 | Example 6 | Example 7 |
|---|---|---|---|---|---|
| Molecular Weight($M_n$) | g/mol | 1,340 | 1,140 | 947 | 1,037 |
| Cast Elastomer | | | | | |
| Curative A | BDO | 5.89 wt. % | 6.88 wt. % | 8.49 wt. % | 7.68 wt. % |
| Cast Elastomer Properties | | | | | |
| Comp Set (Cd) 25% (%) | ASTM D395 | 17.243 | 17.947 | 21.603 | 42.433 |
| Bayshore Resilience (%) | ASTM D2632 | 62.133 | 62.2 | 60.733 | 56.667 |
| Shore A | ASTM D2240 | 90.333 | 93 | 94.333 | 91.667 |
| Split Tear (ppi) | ASTM D624 | 129.237 | 150.667 | 176.33 | 223.833 |
| Stress at 50% (psi) | ASTM D412/ Die C | 886.983 | 1137.267 | 1521.867 | 1274.783 |
| Stress at 100% (psi) | ASTM D412/ Die C | 1059.783 | 1308.6 | 1682.817 | 1397.35 |
| Stress at 200% (psi) | ASTM D412/ Die C | 1356.683 | 1600.867 | 1976 | 1582.133 |
| Stress at 300% (psi) | ASTM D412/ Die C | 1761.267 | 1998.05 | 2450.45 | 1812.483 |
| Tensile Modulus (psi) | ASTM D412/ Die C | 6921 | 10879.567 | 20117.5 | 13795.617 |
| Break Elongation (%) | ASTM D412/ Die C | 463.433 | 480.717 | 445.533 | 591.65 |
| Peak Stress (psi) | ASTM D412/ Die C | 3606.415 | 4025.285 | 4244.762 | 2846.15 |

Referring now to Table 2, the use of the Isocyanate Prepolymers of Examples 4-7 yield the cast elastomers of Examples 4-7 which demonstrate improved physical properties with increased hard block content. That is, cast elastomers formed with the Isocyanate Prepolymers of Examples 4-7 achieved improvement in Young's modulus which increases significantly in the presence of graphene with each increase in molar percent hard block. Further, the cast elastomers of Examples 4-7 exhibit significant improvements in modulus with elongation, and tear is also established while maintaining ultimate elongation and tensile strength.

Figure 3:
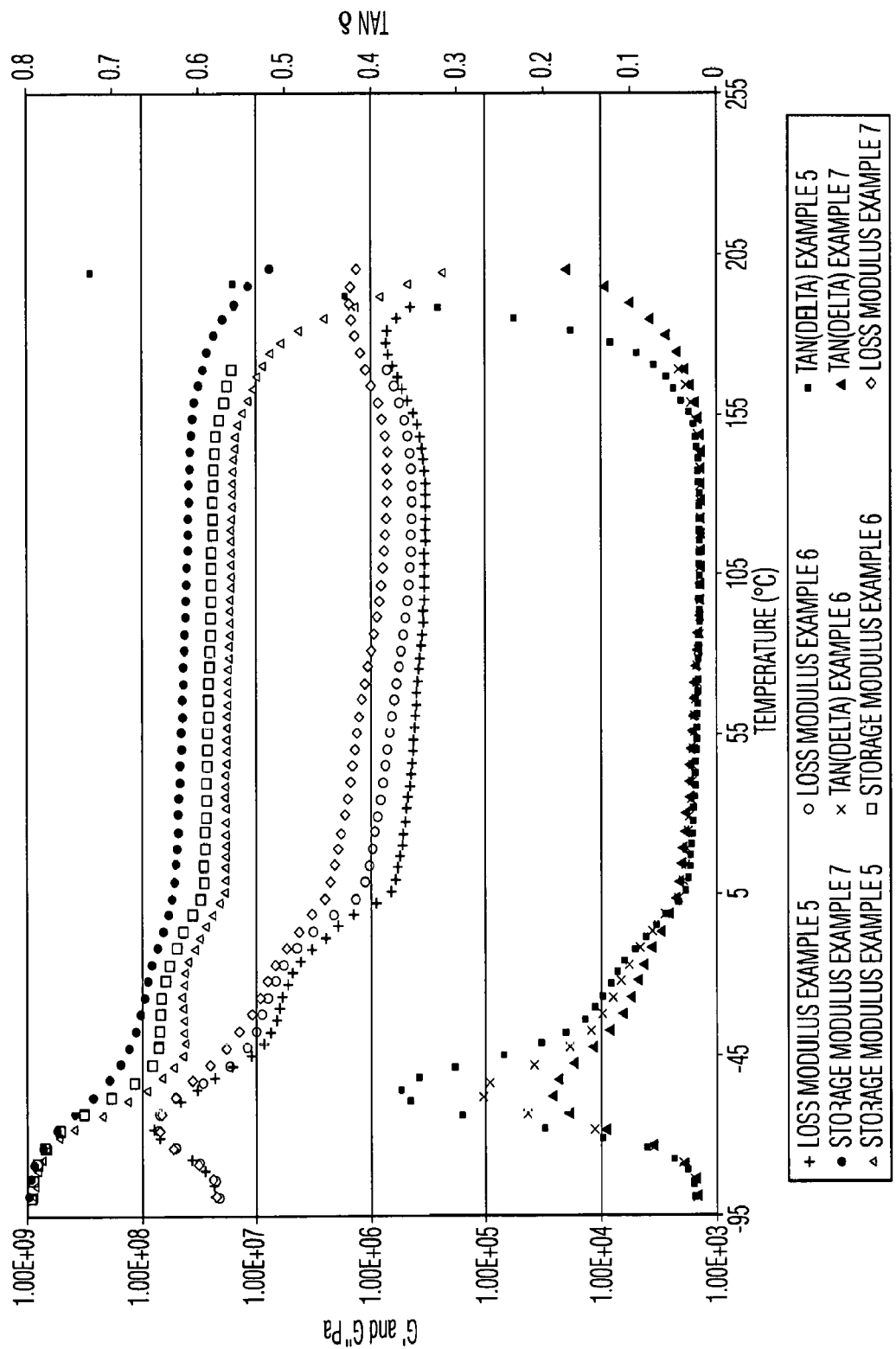
FIG. 3 is a graph characterizing loss modulus, storage modulus, and tangent delta (tan δ) of Examples 5-7.

Referring now to FIG. 3, the loss modulus, storage modulus, and tangent delta (tan δ) of Examples 5-7 are determined via dynamic mechanical thermal analysis (DMTA). The tan δ is the ratio of the loss modulus to the storage modulus. The cast elastomers of Examples 5-7, which include the isocyanate prepolymer comprising GNP, demonstrate an increase in modulus with increasing hard block content. Further, FIG. 3 shows that the cast elastomers of Examples 5-7, which include the isocyanate prepolymer comprising GNP, exhibit a glass transition temperature ($T_g$) and have a stable rubbery plateau. Still referring to FIG. 3, the modulus of the rubbery plateau and the onset to melt increases with each increase in % molar hard block over a range of −45° C. to >150° C. for Examples 5-7.

Examples 8-10

The isocyanate prepolymers of Examples 8-10 are formed in accordance with the subject disclosure. The isocyanate prepolymer of Comparative Example 2 is formed without GNP for comparative purposes. The isocyanate prepolymers of Examples 8-10 are a black, viscous liquid.

The isocyanate prepolymers of Examples 8-10 are reacted with Curative A to form the cast elastomers of Examples 8-10. The isocyanate prepolymer of Comparative Example 2 is also reacted with Curative A to form the cast elastomer of Comparative Example 2. The cast elastomers of Examples 8-10 are formed into black, molded articles. The amounts of all components used to form Examples 8-10 are set forth in Table 3 below with all amounts in % by weight based on the total weight of the reactants reacted to form the cast elastomers of Examples 8-10.

To form the isocyanate prepolymers of Examples 8-10 and the cast elastomers of Examples 8-10, the GNP is mixed with the polyethylene glycol adipate polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer. The cast elastomer may be pelletized, and extruded into a mold to produce a TPU.

TABLE 3

| Component | Description | Comparative Example 2 | Example 8 | Example 9 | Example 10 |
|---|---|---|---|---|---|
| Isocyanate Prepolymer | | | | | |
| Isocyanate | MDI, | 26.90 wt. % | 27.11 wt. % | 28.11 wt. % | 27.04 wt. % |
| Polyol C | Polyethylene glycol adipate, $M_n$ 2000 g/mol | 66.73 wt. % | 64.47 wt. % | 64.47 wt. % | 64.57 wt. % |

TABLE 3-continued

| Component | Description | Comparative Example 2 | Example 8 | Example 9 | Example 10 |
|---|---|---|---|---|---|
| GNP | ≤1% OC, 10 μm PS | — | 1.87 wt. % | — | — |
| GNP | ≤1% OC, 7 μm PS | — | — | 1.87 wt. % | — |
| GNP | ≤3% OC, 5 μm PS | — | — | — | 1.87 wt. % |
| Isocyanate Prepolymer Properties | | | | | |
| NCO Content | % by Weight | 6.62 | 6.81 | 6.81 | 6.78 |
| Molecular Weight($M_n$) | g/mol | 1,270 | 1,234 | 1.234 | 1,240 |
| Cast Elastomer | | | | | |
| Curative A | BDO | 6.38 wt. % | 6.55 wt. % | 6.55 wt. % | 6.52 wt. % |
| Cast Elastomer Properties | | | | | |
| Comp Set (Cd) 25% (%) | ASTM D395 | 14.833 | 15.917 | 22.463 | 18.810 |
| Bayshore Resilience (%) | ASTM D2632 | 34.000 | 36.667 | 37.667 | 36.667 |
| Shore A | ASTM D2240 | 80.667 | 87.000 | 86.667 | 86.667 |
| Split Tear (ppi) | ASTM D624 | 282.220 | 344.873 | 354.863 | 360.920 |
| Stress at 10% (psi) | ASTM D412/ Die C | 237.300 | 459.240 | 462.780 | 434.080 |
| Stress at 100% (psi) | ASTM D412/ Die C | 737.620 | 1038.780 | 1028.180 | 1026.160 |
| Stress at 200% (psi) | ASTM D412/ Die C | 1058.860 | 1353.580 | 1354.140 | 1343.100 |
| Stress at 50% (psi) | ASTM D412/ Die C | 566.520 | 859.840 | 852.400 | 841.420 |
| Break Elongation (%) | ASTM D412/ Die C | 586.980 | 589.320 | 603.780 | 598.800 |
| Peak Stress (psi) | ASTM D412/ Die C | 6144.192 | 6194.920 | 6160.812 | 5952.288 |
| Young's Modulus (psi) | ASTM D412/ Die C | 2729.740 | 6945.020 | 7218.820 | 6450.440 |

Referring now to Table 3, Examples 8-10, which include GNP, exhibit excellent physical properties over Comparative Example 2, which does not include GNP. For example, Bayshore Resilience is maintained over Comparative Example 2, hardness is increased over Comparative Example 2 by up to 6.33 points), tear strength is increased over Comparative Example 2 (by up to 120%), stress at elongation is increased over Comparative Example 2 (from 10-200%), elongation at brake is maintained with the inclusion of GNP and increased cross-linking, peak stress is maintained with the inclusion of GNP and increased cross-linking, and Young's modulus is increased over Comparative Example 1 (by up to Up to 254%). As such, the cast elastomers of Examples 8-10, which are formed with the isocyanate prepolymer comprising GNP, exhibit improvements in modulus with elongation, Young's modulus, and tear while maintaining ultimate elongation and tensile strength.

Figure 4:
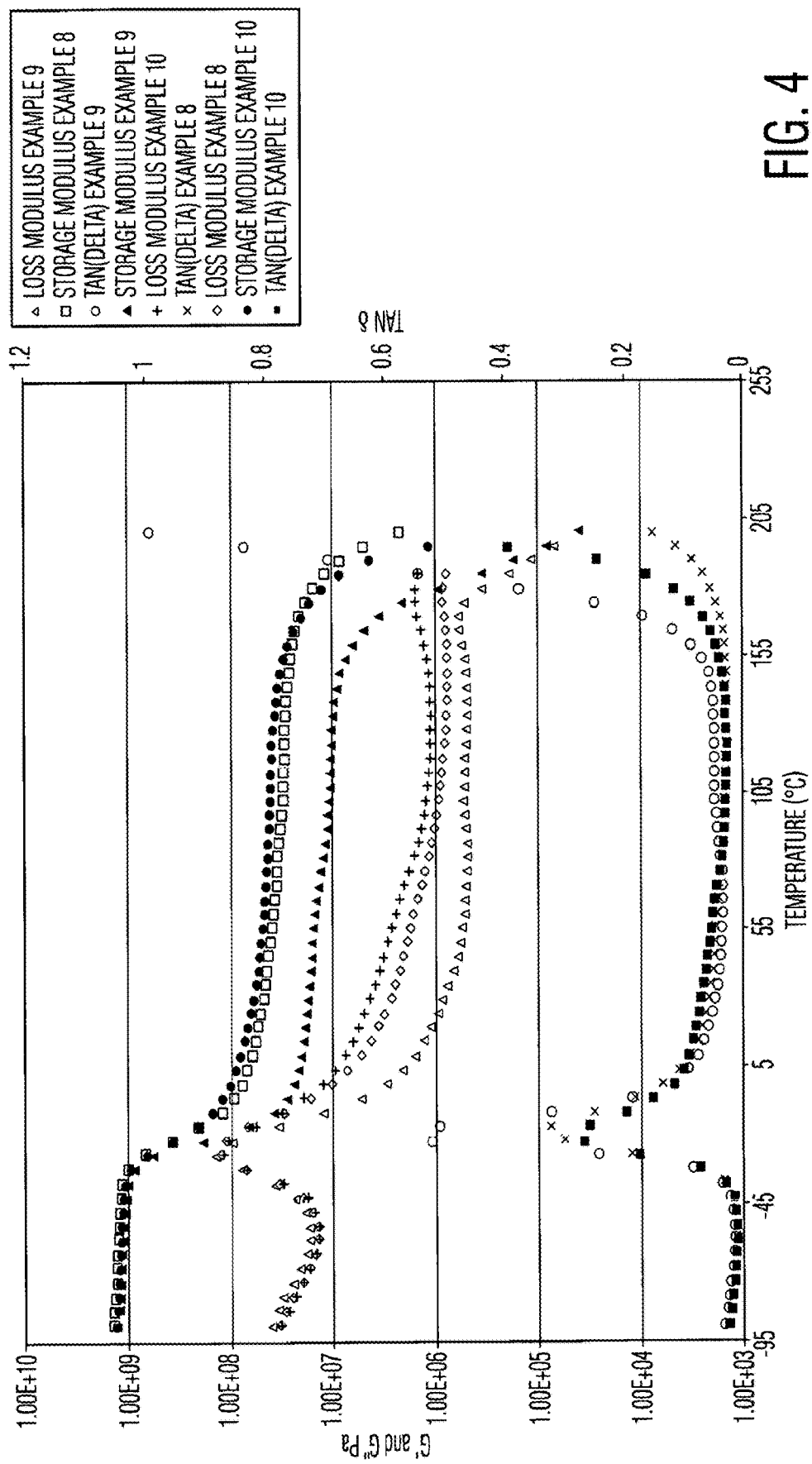
FIG. 4 is a graph characterizing loss modulus, storage modulus, and tangent delta (tan δ) of Examples 2, and Examples 8-10.

Referring now to FIG. 4, the loss modulus, storage modulus, and tangent delta (tan δ) of Examples 8-10 are determined via dynamic mechanical thermal analysis (DMTA). The tan δ is the ratio of the loss modulus to the storage modulus. Examples 8-10, which include GNP, demonstrate an increase in modulus with increasing hard block content. Further, FIG. 4 shows that the cast elastomers of Examples 8-10, which include the isocyanate prepolymer comprising GNP, exhibit a glass transition temperature ($T_g$) and have a stable rubbery plateau. Still referring to FIG. 4, the modulus of the rubbery plateau and the onset to melt increases with each increase in % molar hard block over a range of −45° C. to >150° C. for Examples 8-10.

Examples 11-14

The isocyanate prepolymers of Examples 11-14 are formed in accordance with the subject disclosure. The isocyanate prepolymer of Comparative Example 3 is formed without GNP for comparative purposes. The isocyanate prepolymers of Examples 11-14 area black, viscous liquid.

The isocyanate prepolymers of Examples 11-14 are reacted with Curative A to form the cast elastomers of Examples 11-14. The isocyanate prepolymer of Comparative Example 3 is also reacted with Curative A to form the cast elastomer of Comparative Example 3. The cast elastomers of Examples 11-14 are formed into black, molded articles. The amounts of all components used to form Examples 11-14 are set forth in Table 4 below with all amounts in % by weight based on the total weight of the reactants reacted to form the cast elastomers of Examples 11-14.

To form the isocyanate prepolymers of Examples 11-14 and the cast elastomers of Examples 11-14, the GNP is mixed with the polyester polyol. This mixture is reacted with the MDI to produce the prepolymer. The prepolymer is reacted with the curative in the presence of stabilizing and defoaming additives and a catalyst (at less than 0.5% by weight based on the total weight of the reactants) a cast elastomer. The cast elastomer may be pelletized, and extruded into a mold to produce a TPU.

TABLE 4

| Component | Description | Comparative Example 3 | Example 11 | Example 12 | Example 13 | Example 14 |
|---|---|---|---|---|---|---|
| Isocyanate Prepolymer | | | | | | |
| Isocyanate | MDI, | 26.90 wt. % | 26.60 wt. % | 33.08 wt. % | 35.57 wt. % | 33.26 wt. % |
| Polyol C | Polyethylene glycol adipate, $M_n$ 2000 g/mol | 66.73 wt. % | 65.19 wt. % | 56.09 wt. % | 52.60 wt. % | 29.79 wt. % |
| Polyol D | Polyethylene glycol adipate, $M_n$ 1000 g/mol | — | — | — | — | 26.84 wt. % |
| GNP | ≤1% OC, 10 μm PS | — | 1.87 wt. % | 1.82 wt. % | 1.80 wt. % | 1.83 wt. % |
| Isocyanate Prepolymer Properties | | | | | | |
| NCO Content | % by Weight | 6.62 | 6.58 | 9.58 | 10.78 | 8.78 |
| Molecular Weight ($M_n$) | g/mol | 1,270 | 1,277 | 877 | 780 | 957 |
| Cast Elastomer | | | | | | |
| Curative A | BDO | 6.38 wt. % | 6.34 wt. % | 9.01 wt. % | 10.03 wt. % | 8.28 wt. % |
| Cast Elastomer Properties | | | | | | |
| Comp Set (Cd) 25% (%) | ASTM D395 | 44.770 | 31.780 | 27.797 | 31.437 | 35.080 |
| Bayshore Resilience (%) | ASTM D2632 | 25.667 | 37.000 | 40.067 | 44.000 | 31.600 |
| Shore A | ASTM D2240 | 78.333 | 82.333 | 84.667 | 84.000 | 83.000 |
| Split Tear (ppi) | ASTM D624 | 333.653 | 380.093 | 592.553 | 637.943 | 547.973 |
| Stress at 10% (psi) | ASTM D412/ Die C | 666.833 | 929.217 | 1622.240 | 1963.067 | 1469.917 |
| Stress at 100% (psi) | ASTM D412/ Die C | 835.167 | 1102.400 | 1789.280 | 2074.767 | 1637.700 |
| Stress at 200% (psi) | ASTM D412/ Die C | 1188.783 | 1428.833 | 2116.680 | 2290.150 | 1917.367 |
| Stress at 50% (psi) | ASTM D412/ Die C | 1844.067 | 1909.417 | 2621.060 | 2621.617 | 2322.650 |
| Break Elongation (%) | ASTM D412/ Die C | 617.717 | 616.217 | 491.480 | 532.600 | 586.917 |
| Peak Stress (psi) | ASTM D412/ Die C | 6310.455 | 5964.638 | 4948.860 | 3924.878 | 5717.000 |
| Young's Modulus (psi) | ASTM D412/ Die C | 3655.500 | 8123.533 | 20242.720 | 28173.050 | 14316.233 |

Referring now to Table 4, the use of the Isocyanate Prepolymers of Examples 11-14 yields the cast elastomers of Examples 11-14 which demonstrate improved physical properties with increased hard block content. That is, Young's modulus increases significantly in the presence of GNP with each increase in molar percent hard block with respect to the cast elastomers of Examples 11-14, which are formed with the isocyanate prepolymer comprising GNP. Further, the cast elastomers of Examples 11-14, which are formed with the isocyanate prepolymer comprising GNP, exhibit excellent modulus with elongation and tear while maintaining elongation and tensile strength.

Example 15

The isocyanate prepolymer of Example 15 is formed in accordance with the subject disclosure. The isocyanate prepolymer of Comparative Example 4 is formed without GNP for comparative purposes. The isocyanate prepolymer of Example 15 is a black, viscous liquid.

The isocyanate prepolymer of Example 15 is reacted with Curative A to form the cast elastomer of Example 15. The isocyanate prepolymer of Comparative Example 4 is also reacted with Curative A to form the cast elastomer of Comparative Example 4. The cast elastomer of Example 15 is formed into black, molded articles. The amounts of all components used to form Example 15 are set forth in Table 4 below with all amounts in % by weight based on the total weight of the reactants reacted to form the cast elastomers of Example 15.

To form the isocyanate prepolymers of Example 15 and the cast elastomer of Examples 15, the GNP is mixed with the polycaprolactone polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer. The cast elastomer may be pelletized, and extruded into a mold to produce a TPU.

TABLE 5

| Component | Description | Comparative Example 4 | Example 15 |
|---|---|---|---|
| Isocyanate Prepolymer | | | |
| Isocyanate | MDI | 27.80 wt. % | 27.47 wt. % |
| Polyol E | Polycaprolactone | 65.45 wt. % | 64.16 wt. % |
| GNP | ≤1% OC, 10 μm PS | — | 1.87 wt. % |
| Isocyanate Prepolymer Properties | | | |
| NCO Content | % by Weight | 7.03 | 6.95 |
| Molecular Weight ($M_n$) | g/mol | 1,195 | 1,209 |
| Cast Elastomer | | | |
| Curative A | BDO | 6.75 wt. % | 6.50 wt. % |
| Cast Elastomer Properties | | | |
| Comp Set (Cd) 25% (%) | ASTM D395 | 14.6 | — |
| Bayshore Resilience (%) | ASTM D2632 | 53.0 | — |
| Shore A | ASTM D2240 | 85.0 | 95.0 |
| Split Tear (ppi) | ASTM D624 | 153.4 | 168.0 |
| Stress at 10% (psi) | ASTM D412/ Die C | — | 463.0 |
| Stress at 100% (psi) | ASTM D412/ Die C | 860.0 | 1094.0 |
| Stress at 200% (psi) | ASTM D412/ Die C | 1293.0 | 1406.0 |
| Stress at 50% (psi) | ASTM D412/ Die C | 683.0 | 917.0 |
| Break Elongation (%) | ASTM D412/ Die C | 412.0 | 462.0 |
| Peak Stress (psi) | ASTM D412/ Die C | 5465.0 | 5232.0 |
| Young's Modulus (psi) | ASTM D412/ Die C | 4447.0 | 8053.0 |

Referring now to Table 5, the use of the Isocyanate Prepolymer of Example 15 produced the cast elastomer of Example 15 which demonstrates improved physical properties over the cast elastomer of Comparative Example 4.

Examples 16 and 17

The isocyanate prepolymers of Examples 16 and 17 are formed in accordance with the subject disclosure. The isocyanate prepolymers of Comparative Examples 4 and 5 are formed without GNP for comparative purposes. The isocyanate prepolymers of Examples 16 and 17 are a black, viscous liquid.

The isocyanate prepolymers of Examples 16 and 17 are reacted with Curative A to form the cast elastomers of Examples 16 and 17. The isocyanate prepolymers of Comparative Examples 4 and 5 are also reacted with Curative A to form the cast elastomer of Comparative Example 5. The cast elastomers of Examples 16 and 17 are formed into black, molded articles. The amounts of all components used to form Examples 16 and 17 are set forth in Table 6 below with all amounts in % by weight based on the total weight of the reactants reacted to form the cast elastomers of Examples 16 and 17.

To form the isocyanate prepolymers of Examples 16 and 17 and the cast elastomers of Examples 16 and 17, the GNP is mixed with the polycaprolactone-polyTHF copolymer polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer. The cast elastomer may be pelletized, and extruded into a mold to produce a TPU.

TABLE 6

| Component | Description | Comparative Example 5 | Comparative Example 6 | Example 16 | Example 17 |
|---|---|---|---|---|---|
| Isocyanate Prepolymer | | | | | |
| Isocyanate | MDI | 29.72 wt. % | 31.94 wt. % | 29.47 wt. % | 32.85 wt. % |
| Polyol F | Polycapralactone, pTHF copolymer | 62.95 wt. % | 59.83 wt. % | 61.36 wt. % | 56.42 wt. % |
| GNP | ≤1% OC, 10 μm PS | — | — | 1.85 wt. % | 1.82 wt. % |
| Isocyanate Prepolymer Properties | | | | | |
| NCO Content | % by Weight | 7.88 | 8.91 | 7.86 | 9.47 |
| Molecular Weight($M_n$) | g/mol | 1,064 | 944 | 1,063 | 885 |
| Cast Elastomer | | | | | |
| Curative | BDO | 7.33 wt. % | 8.23 wt. % | 7.32 wt. % | 8.91 wt. % |
| Cast Elastomer Properties | | | | | |
| Comp Set (Cd) 25% (%) | ASTM D395 | — | — | 26.0 | 27.0 |
| Bayshore Resilience (%) | ASTM D2632 | — | — | 60.0 | 59.0 |
| Shore A | ASTM D2240 | 85.0 | 87.0 | 96.0 | 97.0 |

TABLE 6-continued

| Component | Description | Comparative Example 5 | Comparative Example 6 | Example 16 | Example 17 |
|---|---|---|---|---|---|
| Split Tear (ppi) | ASTM D624 | 140.0 | 188.0 | 194.0 | 313.0 |
| Stress at 10% (psi) | ASTM D412/ Die C | 355.0 | 586.0 | 860.0 | 1288.0 |
| Stress at 100% (psi) | ASTM D412/ Die C | 941.0 | 1308.0 | 1459.0 | 1839.0 |
| Stress at 200% (psi) | ASTM D412/ Die C | 1345.0 | 1724.0 | 1712.0 | 2049.0 |
| Stress at 50% (psi) | ASTM D412/ Die C | 739.0 | 1083.0 | 1321.0 | 1738.0 |
| Break Elongation (%) | ASTM D412/ Die C | 442.0 | 447.0 | 479.0 | 480.0 |
| Peak Stress (psi) | ASTM D412/ Die C | 5080.0 | 4849.0 | 4804.0 | 4994.0 |
| Young's Modulus (psi) | ASTM D412/ Die C | 4463.0 | 7460.0 | 13942.0 | 23242.0 |

Referring now to Table 6, the use of the Isocyanate Prepolymers of Examples 16 and 17 produce the cast elastomers of Examples 16 and 17 which demonstrate improved physical properties over the cast elastomers of Comparative Examples 5 and 6. That is, Young's modulus increases significantly in the presence of GNP with each increase in molar percent hard block with respect to the cast elastomers of Examples 16 and 17, which are formed with the isocyanate prepolymer comprising GNP. Further, the cast elastomers of Examples 16 and 17, which are formed with the isocyanate prepolymer comprising GNP, exhibit excellent modulus with elongation and tear while maintaining elongation and tensile strength.

Examples 18-21

The isocyanate prepolymers of Examples 18-21 are formed in accordance with the subject disclosure. The isocyanate prepolymers of Examples 18-21 are a black, viscous liquid.

The isocyanate prepolymers of Examples 18-21 are reacted with Curative A to form the cast elastomers of Examples 18-21. The cast elastomers of Examples 18-21 are formed into black, molded articles. The amounts of all components used to form Examples 18-21 are set forth in Table 7 below with all amounts in % by weight based on the total weight of the reactants reacted to form the cast elastomers of Examples 18-21.

To form the isocyanate prepolymers of Examples 18-21 and the cast elastomers of Examples 16 and 17, the GNP is mixed with the polyTHF. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer. The cast elastomer may be pelletized, and extruded into a mold to produce a TPU.

TABLE 7

| Component | Description | Example 18 | Example 19 | Example 20 | Example 21 |
|---|---|---|---|---|---|
| Isocyanate | MDI | 31.61 wt. % | 31.86 wt. % | 41.13 wt. % | 40.62 wt. % |
| Curative | BDO | 8.47 wt. % | 8.63 wt. % | 10.05 wt. % | 10.16 wt. % |
| Polyol 1 | pTHF 2000 | 59.01 wt. % | 57.8 wt. % | — | — |
| Polyol 2 | pTHF 1000 | — | — | 47.92 wt. % | 44.72 wt. % |
| Graphene nano platelets | ≤1% Oxygen, 10 μm platelets | 0.92 wt. % | 1.83 wt. % | 0.90 wt. % | 4.5 wt. % |
| Isocyanate Prepolymer | | | | | |
| NCO Content | % by Weight | 8.85 | 9.02 | 10.85 | 10.97 |
| Average MW | g/mol | 950 | 932 | 775 | 766 |
| Cast Elastomer | | | | | |
| Curative | BDO | 8.47 wt. % | 8.63 wt. % | 10.05 wt. % | 10.16 wt. % |
| Cast Elastomer Properties | | | | | |
| Comp Set (Cd) 25% (%) | ASTM D395 | 22.85 | 21.85 | 29.67 | 34.23 |
| Bayshore Resilience (%) | ASTM D2632 | 60.2 | 58 | 40 | 43 |
| Shore A | ASTM D2240 | 90 | 91 | 93 | 94 |
| Split Tear (ppi) | ASTM D624 | 208 | 224 | 298 | 346 |

TABLE 7-continued

| Component | Description | Example 18 | Example 19 | Example 20 | Example 21 |
|---|---|---|---|---|---|
| Stress at 50% (psi) | ASTM D412/ Die C | 1266 | 1521 | 2053 | 2298 |
| Stress at 100% (psi) | ASTM D412/ Die C | 1455 | 1667 | 2272 | 2456 |
| Stress at 200% (psi) | ASTM D412/ Die C | 1778 | 1937 | 2773 | 2845 |
| Stress at 300% (psi) | ASTM D412/ Die C | 2213 | 2355 | 3785 | 3722 |
| Break Elongation (%) | ASTM D412/ Die C | 490 | 482 | 395 | 357 |
| Peak Stress (psi) | ASTM D412/ Die C | 4804 | 4695 | 5539 | 4591 |
| Tensile Modulus (psi) | ASTM D412/ Die C | 13236 | 21138 | 24236 | 32161 |

Referring now to Table 7, the use of the Isocyanate Prepolymers of Examples 16 and 17 produce the cast elastomers of Examples 18-21 which demonstrate improved physical properties. That is, Young's modulus increases significantly in the presence of GNP with each increase in molar percent hard block with respect to the cast elastomers of Examples 18-21, which are formed with the isocyanate prepolymer comprising GNP. Further, the cast elastomers of Examples 18-21, which are formed with the isocyanate prepolymer comprising GNP, exhibit excellent modulus with elongation and tear while maintaining elongation and tensile strength. To this end, urethane elastomers comprising from about 0.9 to about 4.5% by weight GNP, based on the total weight of the urethane elastomer, form cast elastomers having excellent physical properties.

Figure 5:
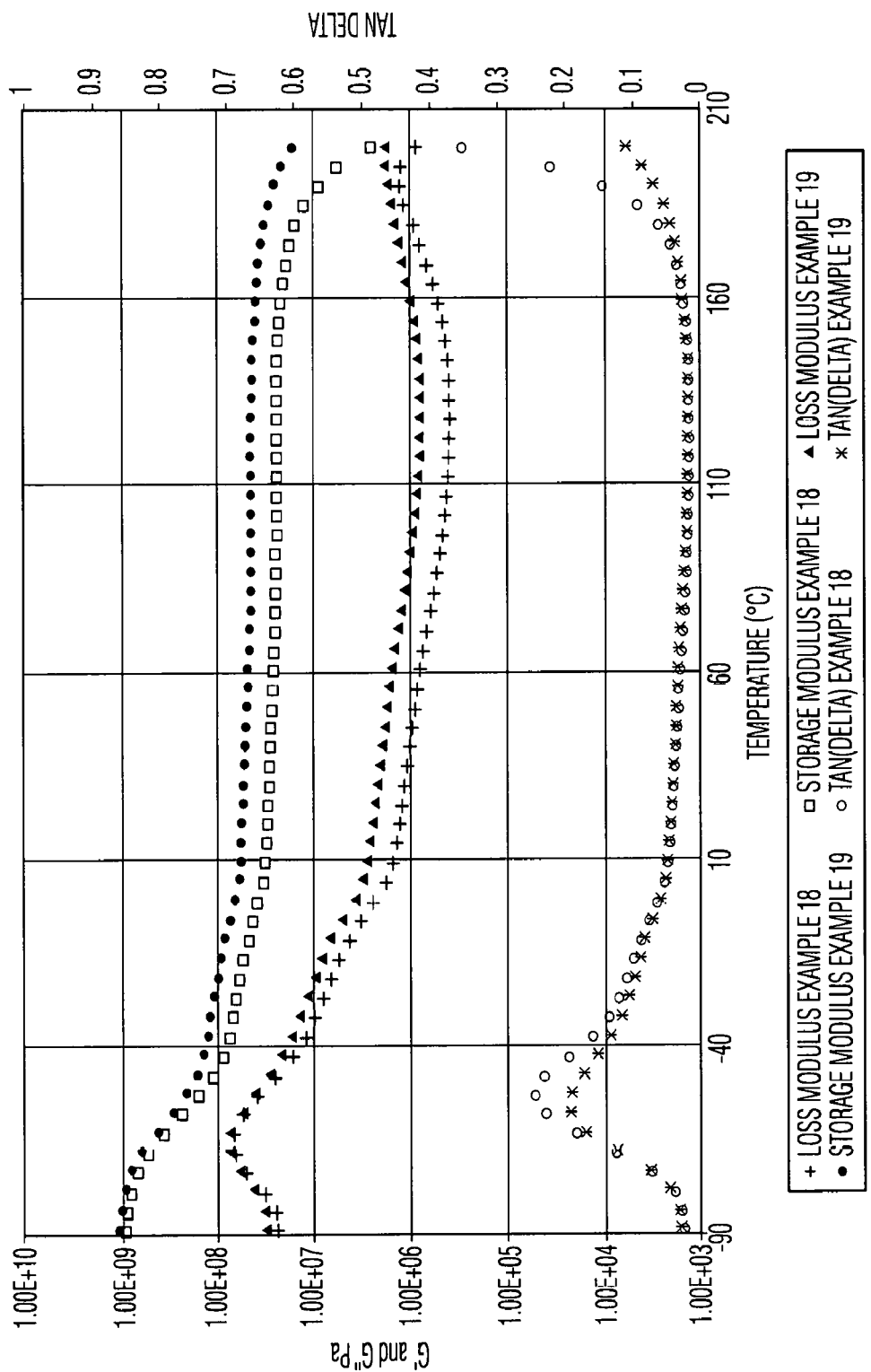
FIG. 5 is a graph characterizing loss modulus, storage modulus, and tangent delta (tan δ) of Examples 18 and 19.

Referring now to FIG. 5, the loss modulus, storage modulus, and tangent delta (tan δ) of Examples 18 and 19 are determined via dynamic mechanical thermal analysis (DMTA). The tan S is the ratio of the loss modulus to the storage modulus.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A polyurethane comprising a reaction product of:
   an isocyanate component;
   a polyol component;
   an aromatic diol having from 8 to 24 carbon atoms; and
   from about 0.1 to about 20% by weight, based on a total weight of the polyurethane, of graphene nano platelets, and an oxygen content of from about 0.01 to about 10% by weight based on a total weight of said graphene nano platelets.

2. A polyurethane as set forth in claim 1 wherein said graphene nano platelets have:
   an oxygen content of from about 0.01 to about 5% by weight based on 100 percent by weight of the graphene nano platelets.

3. A polyurethane as set forth in claim 1 comprising about 0.1 to about 5% by weight of said graphene nano platelets based on the total weight of said polyurethane.

4. A polyurethane as set forth in claim 1 comprising:
an isocyanate prepolymer comprising the reaction product of said isocyanate component comprising an aromatic isocyanate, said polyol component, said aromatic diol having from 8 to 24 carbon atoms; and said graphene nano platelets; and
at least one of a polyol, a diol, or an amine.

5. A polyurethane as set forth in claim 1 wherein said polyol component comprises a polyether polyol.

6. A polyurethane as set forth in claim 1 wherein said polyol component comprises a polyester polyol.

7. A polyurethane as set forth in claim 1 wherein said polyol component comprises a polyol formed from tetrahydrofuran and/or caprolactone.

8. A polyurethane as set forth in claim 1 having a hard block content of from about 50 to about 95 molar %.

9. A polyurethane as set forth in claim 1 which is further defined as a polyurethane cast elastomer, a thermoplastic polyurethane elastomer, a polyurethane foam, or a polyurethane adhesive.

10. An isocyanate prepolymer having an isocyanate content of from about 4 to about 30% by weight, said prepolymer comprising a reaction product of:
an aromatic isocyanate;
a polyol;
an aromatic diol having from 8 to 24 carbon atoms; and
from about 0.1 to about 20% by weight, based on a total weight of the isocyanate prepolymer, of graphene nano platelets, and an oxygen content of from about 0.01 to about 10% by weight based on the total weight of said graphene nano platelets.

11. An isocyanate prepolymer as set forth in claim 10 wherein said graphene nano platelets have:
an oxygen content of from about 0.01 to about 5% by weight based on 100 percent by weight of the graphene nano platelets.

12. An isocyanate prepolymer as set forth in claim 10 comprising about 0.1 to about 5% by weight of said graphene nano platelets based on the total weight of said isocyanate prepolymer.

13. An isocyanate prepolymer as set forth in claim 10 having a weight average molecular weight (Mw) of from about 100 to about 5,000.

14. An isocyanate prepolymer as set forth in claim 10 having an isocyanate content from about 5 to about 20% by weight.

15. An isocyanate prepolymer as set forth in claim 10 wherein said polyol comprises a polyether polyol.

16. An isocyanate prepolymer as set forth in claim 10 wherein said polyol comprises a polyester polyol.

17. An isocyanate prepolymer as set forth in claim 10 wherein said aromatic isocyanate comprises methylene diphenyl diisocyanate and/or polymeric methylene diphenyl diisocyanate.

18. An isocyanate prepolymer as set forth in claim 10 wherein said polyol comprises a polyol formed from tetrahydrofuran and/or caprolactone.

19. An isocyanate prepolymer as set forth in claim 18 wherein said polyol formed from tetrahydrofuran and/or caprolactone is further defined as a block copolymer comprising polymerized polytetrahydrofuran and polycapralactone blocks.

20. A polyurethane elastomer comprising the reaction product of:
said isocyanate prepolymer as set forth in claim 18;
an aliphatic diol having from 2 to 12 carbon atoms and/or an amine; and
optionally one or more polyols;
wherein said polyurethane elastomer has a hard block content of from about 50 to about 95 molar % based on a total equivalent of said aliphatic diol and/or said amine divided by a total equivalent of NCO used to form said polyurethane elastomer.

21. A polyurethane elastomer comprising
said isocyanate prepolymer as set forth in claim 10;
wherein said polyurethane elastomer has a hard block content of from about 50 to about 95 molar % based on a total equivalent of said aromatic diol divided by a total equivalent of NCO used to form said polyurethane elastomer.

22. A thermoplastic polyurethane elastomer formed with the isocyanate prepolymer as set forth in claim 10.

23. A method of forming an isocyanate prepolymer having a weight average molecular weight (Mw) of from about 100 to about 5,000 g/mol, said method comprising the step of reacting:
an aromatic isocyanate;
a polyol;
an aromatic diol having from 8 to 24 carbon atoms; and
from about 0.1 to about 20% by weight, based on a total weight of the isocyanate prepolymer, of graphene nano platelets, and an oxygen content of from about 0.01 to about 10% by weight based on a total weight of said graphene nano platelets.

24. A method as set forth in claim 23 wherein the step of reacting is substantially free of solvent.

25. A method as set forth in claim 23 wherein the aromatic isocyanate comprises methylene diphenyl diisocyanate and/or the polyol is selected from the group consisting of polyether polyols, polyester polyols, natural oil polyols, polydiene polyols, and combinations thereof.

26. A method as set forth in claim 23 wherein the graphene nano platelets have:
an oxygen content of from about 0.7 to about 5% by weight based on 100 percent by weight of the graphene nano platelets.

27. A method as set forth in claim 23 wherein the isocyanate prepolymer comprises about 0.1 to about 5% by weight of the graphene nano platelets, based on the total weight of the isocyanate prepolymer.

28. A method as set forth in claim 23 wherein the step of reacting the aromatic isocyanate, the polyol, and the graphene nano platelets includes the steps of:
adding the isocyanate into a reaction vessel;
mixing the polyol and the graphene nano platelets to form an isocyanate reactive mixture; and
incrementally adding the isocyanate reactive mixture to the reaction vessel.

29. A method as set forth in claim 23 further comprising the step of forming a cast elastomer by:
heating the isocyanate prepolymer to a temperature of 20 to 150° C.; and
combining the isocyanate prepolymer with an aliphatic diol having from 2 to 12 carbon atoms.

30. A method as set forth in claim 29 wherein the step of heating is further defined as heating the isocyanate prepolymer to a temperature of 50 to 130° C.

31. A method as set forth in claim 30 further comprising the step of post curing the cast elastomer at a temperature of from about 100 to about 200° C.

32. A method as set forth in claim 23 which is substantially free of solvent.

* * * * *